(12) United States Patent
Wang

(10) Patent No.: US 11,903,043 B2
(45) Date of Patent: Feb. 13, 2024

(54) METHOD FOR IMPLEMENTING DATA TRANSMISSION OF TIME SENSITIVE NETWORK, RELATED DEVICE AND MEDIUM

(71) Applicant: TENCENT TECHNOLOGY (SHENZHEN) COMPANY LIMITED, Guangdong (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 368 days.

(21) Appl. No.: 17/494,028

(22) Filed: Oct. 5, 2021

(65) Prior Publication Data

US 2022/0030641 A1    Jan. 27, 2022

Related U.S. Application Data

(63) Continuation of application No. PCT/CN2020/115054, filed on Sep. 14, 2020.

(30) Foreign Application Priority Data

Sep. 27, 2019    (CN) .......................... 201910927880.X

(51) Int. Cl.
*H04W 76/10*    (2018.01)
*H04L 47/28*    (2022.01)
(Continued)

(52) U.S. Cl.
CPC ............. *H04W 76/10* (2018.02); *H04L 47/28* (2013.01); *H04W 28/0268* (2013.01);
(Continued)

(58) Field of Classification Search
CPC . H04L 45/3065; H04L 47/2416; H04L 47/28; H04L 47/801; H04W 28/0268;
(Continued)

(56) References Cited

U.S. PATENT DOCUMENTS 11,546,805 B2 *    1/2023    Prabhakar ........... H04L 43/0852
2017/0099118 A1    4/2017    Negalaguli et al.
(Continued)

FOREIGN PATENT DOCUMENTS

CN    103597778 A    2/2014
CN    109218038 A    1/2019
(Continued)

OTHER PUBLICATIONS

Extended European Search Report dated Sep. 4, 2023, issued in European Application No. 20869386.1.
(Continued)

*Primary Examiner* — Robert J Lopata
(74) *Attorney, Agent, or Firm* — Sughrue Mion, PLLC

(57) ABSTRACT

A method for implementing data transmission of a time sensitive network (TSN) is provided. The method includes, reporting, by a session management function (SMF) device, a port number list of a device-side TSN converter to an application function device and a port number list of a network TSN converter, and receiving, by the SMF device, a port configuration parameter issued by the application function device, the port configuration parameter comprising port resources associated with a protocol data unit (PDU) session. The PDU includes a plurality of periodic time sensitive communication service data flows, The plurality of periodic time-sensitive communication service data
(Continued)

flows have the same quality of service requirement. The plurality of periodic time-sensitive communication service data flows have the same period and the same period of service quality, the same period being a period of the plurality of periodic time-sensitive communication service data flows being the same.

20 Claims, 7 Drawing Sheets

(51) Int. Cl.
　　　*H04W 28/02*　　(2009.01)
　　　*H04W 40/02*　　(2009.01)
　　　*H04W 80/02*　　(2009.01)
　　　*H04W 80/10*　　(2009.01)

(52) U.S. Cl.
　　　CPC .......... *H04W 40/02* (2013.01); *H04W 80/02* (2013.01); *H04W 80/10* (2013.01)

(58) Field of Classification Search
　　　CPC ..... H04W 40/02; H04W 76/10; H04W 76/11; H04W 80/02; H04W 80/10
　　　USPC .......................................................... 370/329
　　　See application file for complete search history.

(56) References Cited

U.S. PATENT DOCUMENTS

| | | | | |
|---|---|---|---|---|
| 2021/0321487 | A1* | 10/2021 | Moon | H04W 76/11 |
| 2022/0030530 | A1* | 1/2022 | Munz | H04J 3/0667 |
| 2022/0256393 | A1* | 8/2022 | Zhang | H04W 28/0263 |
| 2022/0311827 | A1* | 9/2022 | Prabhakar | H04W 28/0268 |
| 2022/0322254 | A1* | 10/2022 | Zhang | H04W 56/001 |
| 2022/0369157 | A1* | 11/2022 | De Andrade Jardim | H04W 28/0268 |
| 2023/0188381 | A1* | 6/2023 | Luetzenkirchen | H04L 12/4625 370/328 |

FOREIGN PATENT DOCUMENTS

| | | |
|---|---|---|
| CN | 110048869 A | 7/2019 |
| CN | 110611924 A | 12/2019 |
| WO | 2019/166081 A1 | 9/2019 |

OTHER PUBLICATIONS

3rd Generation Partnership Project; Technical Specification Group Services and System Aspects; System Architecture for the 5G System (5GS); Stage 2 (Release 16), 3GPP TS 23.501, V16.2.0, Sep. 2019, 391 pages.
Huawei et al., "Procedures for 5GS Bridge information reporting and configuration", 3GPP TSG-WG SA2 Meeting #134, S2-1908619 (e-mail revision 2 of S2-1908565), Sapporo, Japan, Jun. 24-28, 2019, 6 pages.
Qualcomm Incorporated et al., "Completing Ethernet port management", 3GPP TSG-SA WG2 Meeting #133, S2-1908563 (revision of S2-1908535), Sapporo, Japan, Jun. 23-28, 2019, 8 pages.
Secretary of SA WG2, "Draft Report of SA WG2 meeting #132", SA WG2 Meeting #132, Version 0.0.5, Apr. 8-12, 2019, Xi'an, China, 253 pages.
Translation of Written Opinion of the International Searching Authority dated Dec. 14, 2020 in International Application No. PCT/CN2020/115054.
Ericsson, "Support for IEEE 802.1Qbv scheduling", 3GPP TSG-SA WG2 Meeting #132, S2-1903378, Apr. 8-12, 2019, pp. 1-6, Xi'an, China.
Huawei et al., "QoS Negotiation between 3GPP and TSN networks KI#3.1", SA WG2 Meeting #129, S2-1811021, Oct. 15-19, 2018, pp. 1-9, Dongguan, China.
Qualcomm Incorporated et al., "Completing Ethernet port management", 3GPP TSG-SA WG2 Meeting #133, S2-1908535, Jun. 23-28, 2019, 8 pages, Sapporo, Japan.
Huawei et al., "Procedures for 5GS Bridge information reporting and configuration", 3GPP TSG-WG SA2 Meeting #134, S2-1908565, Jun. 24-Jun. 28, 2019, 7 pages, Sapporo, Japan.
Chinese Office Action for 201910927880.X, dated Feb. 26, 2021.
Chinese Office Action for 201910927880.X, dated May 11, 2021.
Written Opinion for PCT/CN2020/115054, dated Dec. 14, 2020.
International Search Report for PCT/CN2020/115054, dated Dec. 14, 2020.

* cited by examiner

METHOD FOR IMPLEMENTING DATA TRANSMISSION OF TIME SENSITIVE NETWORK, RELATED DEVICE AND MEDIUM

CROSS REFERENCE TO RELATED APPLICATION(S)

This application is a continuation application of International Application No. PCT/CN2020/115054 filed on Sep. 14, 2020, which claims priority to Chinese Patent Application No. 201910927880.X filed with the China National Intellectual Property Administration on Sep. 27, 2019, the entire contents of which are incorporated by reference herein.

FIELD

The disclosure generally relates to the field of communication technologies, relates to the field of 5th generation mobile network (5G) and time sensitive network (TSN) technologies, and in particular, to a method for implementing data transmission of a TSN, a session management function (SMF) device, and a computer storage medium.

BACKGROUND

Time sensitive communication (TSC) is introduced into an R16 standard of a $5^{th}$ generation mobile network (5G) system, such that the 5G system may support precise time-controlled industrial automation manufacturing application. According to guidance of the R16 standard of the 5G system, the 5G system may be integrated into a time sensitive network (TSN) as an Ethernet bridge of the TSN, and the integrated system may be referred to as a TSN communication system. Data transmission of a service of the TSN communication system is implemented depending on a port allocated by a centralized network controller (CNC). However, it is found in practice that, in a process of implementing data transmission of the TSN communication system based on the existing standard, problems of a transmission conflict, poor port configuration, and the like occur. As a result, a process of data transmission of a TSN cannot be implemented.

SUMMARY

Embodiments of the disclosure provide a method for implementing data transmission of a time sensitive network (TSN), a related device, and a medium, which may effectively resolve problems of a transmission conflict, poor port configuration, and the like, and ensure a smooth data transmission process of a TSN.

According to an aspect of example embodiments, a method for implementing data transmission of a TSN may include, reporting, by a session management function (SMF) device, a port number list of a device-side TSN converter to an application function device and a port number list of a network TSN converter, and receiving, by the SMF device, a port configuration parameter issued by the application function device, the port configuration parameter comprising port resources associated with a protocol data unit (PDU) session. The PDU includes a plurality of periodic time sensitive communication service data flows, The plurality of periodic time-sensitive communication service data flows have the same quality of service requirement. The plurality of periodic time-sensitive communication service data flows have the same period and the same period of service quality, the same period being a period of the plurality of periodic time-sensitive communication service data flows being the same, or the period of the plurality of periodic time-sensitive communication service data flows having a greatest common divisor.

According to an aspect of example embodiments, an apparatus for implementing data transmission of a TSN may include receiving, by an application function device, a port number list of a device-side TSN converter reported by a SMF device and a port number list of a network TSN converter and sending, by the application function device, a port configuration parameter to the SMF device, the port configuration parameter comprising port resources associated with a PDU session. The PDU includes a plurality of periodic time sensitive communication service data flows, The plurality of periodic time-sensitive communication service data flows have the same quality of service requirement. The plurality of periodic time-sensitive communication service data flows have the same period and the same period of service quality, the same period being a period of the plurality of periodic time-sensitive communication service data flows being the same, or the period of the plurality of periodic time-sensitive communication service data flows having a greatest common divisor.

According to an aspect of example embodiments, an apparatus for implementing data transmission of a TSN may include at least one memory configured to store program code, and at least one processor configured to access the program code and operate as instructed by the program code, the program code including port management parameter reporting code configured to cause the at least one processor to report, to an application function device, a port number list of a device-side TSN converter and a port number list of a network TSN converter, and port configuration parameter receiving code configured to cause the at least one processor to receive a port configuration parameter issued by the application function device, wherein the port configuration parameter comprises a port resource associated with a PDU session. The PDU includes a plurality of periodic time sensitive communication service data flows, The plurality of periodic time-sensitive communication service data flows have the same quality of service requirement. The plurality of periodic time-sensitive communication service data flows have the same period and the same period of service quality, the same period being a period of the plurality of periodic time-sensitive communication service data flows being the same, or the period of the plurality of periodic time-sensitive communication service data flows having a greatest common divisor.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

Figure 1:
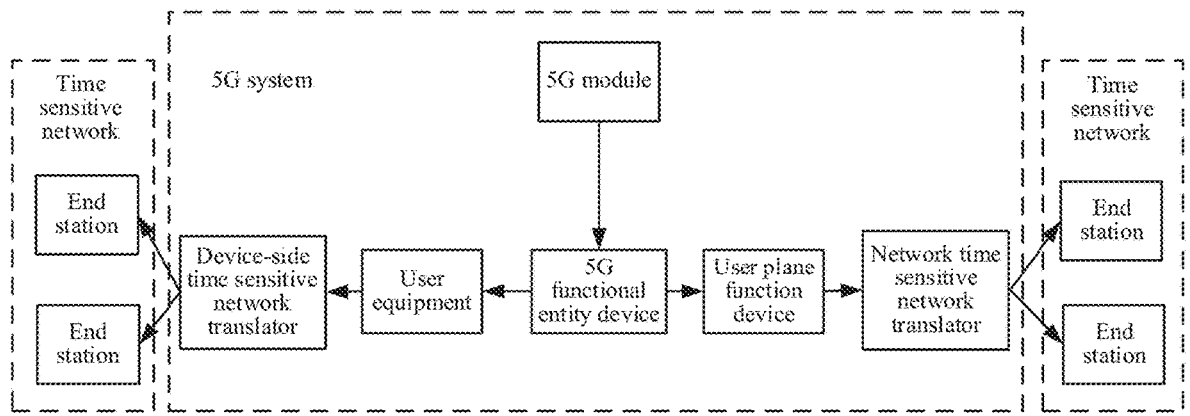
FIG. 1 is a diagram of a time sensitive network (TSN) communication system according to an embodiment.

FIG. 1 is a diagram of a time sensitive network (TSN) communication system. As shown in FIG. 1, the TSN communication system includes a TSN and a $5^{th}$ generation mobile network (5G) system.

The 5G system may include a user equipment (UE) and various functional entity devices. The functional entity devices may include a user plane function (UPF) device, a next-generation (NG) radio access network (NG RAN) function device, an NG interface being an interface between a RAN and a 5G core network, an access and mobility management function (AMF) device, responsible for mobility management and connected to the UE and the NG RAN, a session management function (SMF) device, responsible for session management and connected to the AMF device and the UPF device, a policy control function (PCF) device, responsible for policy control and connected to the SMF device, a unified data manager (UDM), configured to uniformly manage service data, and an application function (AF) device, configured to provide the service data. The TSN may include an end station (ES) and a centralized network controller (CNC). The CNC may be configured to uniformly manage services of the TSN communication system. As shown in FIG. 1, the UE in the 5G system is connected to one or more ESs in a TSN data network (DN) outside the 5G system by a device side TSN translator (DS-TT). The UPF device is connected to the one or more ESs in the TSN DN by a network TSN translator (NW-TT). Both the DS-TT and the NW-TT may provide ports used for performing data transmission.

The service of the TSN communication system includes a periodic time sensitive communication (TSC) service and an aperiodic TSC service, and each TSC service may require the DS-TT and the NW-TT to provide a port to participate in data transmission of the TSC service. Before the TSC service is performed, two ports (i.e., the port provided by the DS-TT and the port provided by the NW-TT) participating in the data transmission may implement precise time synchronization with a clock of the 5G system. Based on completion of synchronization, data communication is performed on the TSC service strictly according to a specified time, this time referring to a time of a TSN domain.

As a controller of the service of the TSN communication system, a control process of the CNC on the TSC service may include operations (1) to (4) as follows.

(1) Determining a data transmission path after a data transmission request from a data transmitter or a data receiver of the TSC service is received. For example, it is determined whether downlink (DL) TSC data or uplink (UL) TSC data may be transmitted. If the DL TSC data may be transmitted, it is determined that the data is transmitted by which ES to which UPF device by using an NW-TT, then it is transmitted to the UE by the UPF device through which quality of service (QoS) flow is provided, and finally it is transmitted to an ES of a communication peer end by the UE by using which DS-TT.

(2) Determining ports involved in the transmission path.

(3) Allocating corresponding TSN port configuration parameters for the ports that are about to participate in data transmission. The corresponding TSN port configuration parameters may be allocated for the ports according to an attribute of service data of the TSC service. Herein, the attribute of the service data includes, but is not limited to, a start time of the service data, periodicity of the service data, a time precision requirement of the service data, a class of the service data, a priority of the service data, and the like. The periodicity of the service data is a period of the service data provided by the AF device, and the start time of the service data is a time of the TSN domain.

(4) Scheduling service data of the TSC service to be transmitted on the configured ports. When different TSC services are scheduled on the same port, the CNC may ensure that service data of the TSC services is transmitted at different times on the same port, to ensure no transmission time conflict, thereby ensuring the time accuracy and determinacy of the TSC service.

As described above, one objective of introducing TSC to an R16 standard of the 5G system is to enable the 5G system to support precise time-controlled industrial automation manufacturing application. To facilitate precise time control of the NG RAN of the 5G system, the SMF device generates TSC assistance information (TSCAI) according to the attribute of the service data provided by the AF device, the TSCAI being actually information about a data flow. In this way, the SMF device transmits the TSCAI to the NG RAN, and the NG RAN may perform precise time control on the data flow according to the TSCAI.

The TSCAI may describe a TSC traffic feature for the 5G system. The knowledge of a TSN traffic pattern is useful for a 5G base station (gNB) to allow the gNB to schedule a periodic and deterministic service flow more efficiently through configuration authorization, semi-persistent scheduling, or dynamic authorization. For a definition of the TSCAI, reference may be made to Table 1 below. The TSCAI may be provided by the SMF device to the NG RAN. For example, the SMF device provides the TSCAI to the NG RAN during establishment of a QoS flow.

TABLE 1

| TSCAI | |
|---|---|
| Assistance information | Description |
| Data flow direction | Direction (DL or UL) of a TSC service data flow |
| Periodicity | Time period between start of two bursts |
| Burst arrival time | An arrival time of a data burst is at an entrance of the RAN (a downstream direction) or at an exit interface of the UE (an upstream direction) |

Table 1 includes a burst arrival time of service data and periodicity of the service data. The service data arrives at the NG RAN packet by packet at the time specified by the periodicity after the burst arrival time is reached.

The SMF device may determine the TSCAI based on information received from the AF device. A burst arrival time component used for indicating that the TSCAI is transmitted to the NG RAN is specified for a 5G clock. The SMF device is responsible for mapping the burst arrival time from a TSN clock (on which a TSN flow is based) to the 5G clock according to a time offset between the TSN clock and the 5G clock reported by the UPF device.

The devices (including the UPF device, the SMF device, the NG RAN, the UE, the DS-TT, and the NW-TT) in the 5G system may be all synchronized to a clock domain of the 5G system (i.e., a 5G clock domain). Before the TSC service is performed, the two ports (i.e., the port provided by the DS-TT and the port provided by the NW-TT) participating in the data transmission may implement precise time synchronization with the 5G clock domain. In addition, the NW-TT and the DS-TT that participate in transmission may accurately measure a time offset between the 5G clock domain and a clock domain in which the TSN DN is located (i.e., a TSN clock domain). The NW-TT is used as an example. The TSN DN connected to the UPF device/the NW-TT has a particular clock domain (i.e., the TSN clock domain), but the TSN clock domain and the 5G clock domain are two different dock domains. Therefore, the NW-TT on the UPF device may measure the time offset between the 5G dock domain and the TSN clock domain, and report the time offset to the SMF device. The DS-TT on the UE also may measure the time offset between the 5G clock domain and the TSN dock domain, but does not may report the measured time offset to the SMF device. Further, the ES connected to the DS-TT synchronizes a clock of the TSN domain with the TSN DN by using the DS-TT, the 5G system, and the NW-TT, thereby achieving clock synchronization between the ES connected to the DS-TT and the TSN DN.

Figure 2:
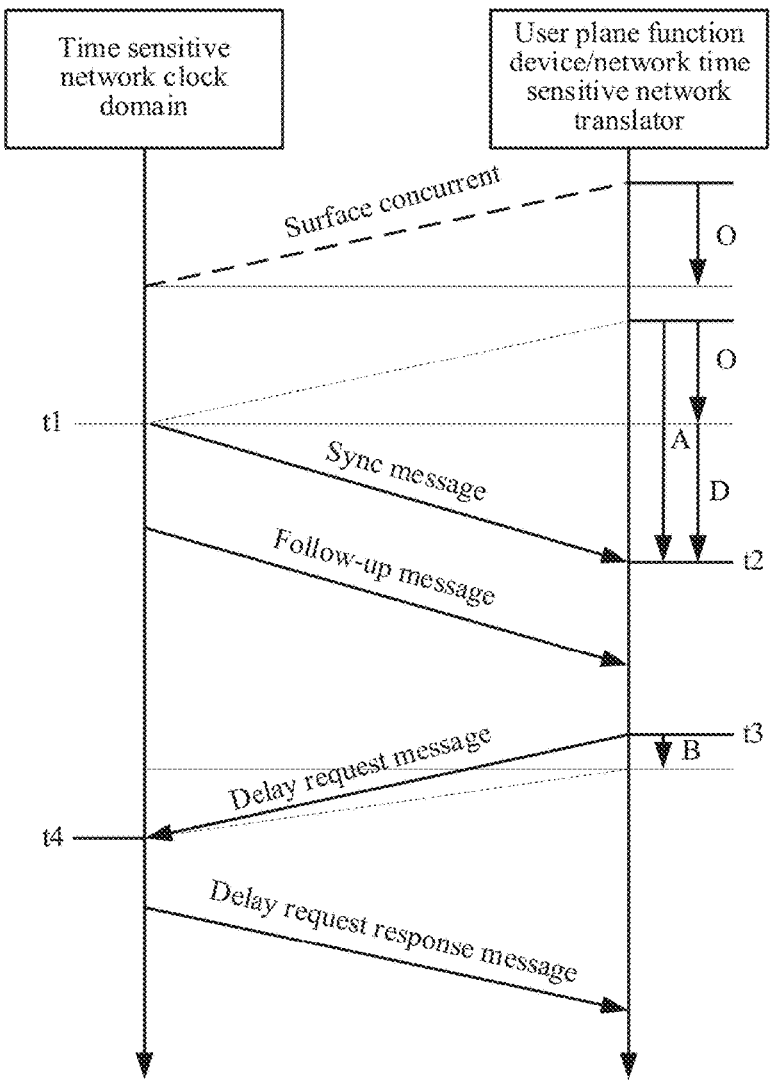
FIG. 2 is a flowchart of time offset measurement according to an embodiment.

FIG. 2 is a flowchart of time offset measurement according to an embodiment. The time offset measurement may be implemented by using a precision time protocol (PTP), defined by an IEEE 1588 standard)/generalized PTP (gPTP, defined by an IEEE 802.1AS standard) message and algorithm. The following equations are involved in FIG. 2:

$O=\text{Offset}=5G$ clock domain−TSN clock domain in which the UPF device/the NW-TT is located;

$t2=t1+D+O;$ $A=t2-t1=D+O;$ $B=t4-t3=D-O;$ $D=(A+B)/2;$ $O=(A-B)/2;$ $t4=t3-O+D.$

According to the above equations, it can be seen that the time offset between the 5G clock domain and the TSN clock domain in which the UPF device/the NW-TT is located may be represented as O=Offset (t2+t3−t1−t4)/2. A and B are intermediate variables, t1 is a time value of the TSN clock domain carried in a Sync message or a Follow_up message transmitted by the TSN DN, t2 and t3 are time values of the 5G clock domain, t2 represents the time value of the 5G clock domain corresponding to a case where the UPF device/the NW-TT receives the Sync message, t3 represents the time value of the 5G clock domain corresponding to a case where the UPF device/the NW-TT transmits a Delay_Req message, D represents a transmission delay value in which the message is transmitted from the TSN DN to the 5G system, and t4 is a time value of the TSN clock domain corresponding to a case where the TSN DN receives the Delay_Req message. When the NW-TT on the UPF device obtains the time offset O between the local 5G clock domain and the TSN clock domain through measurement, a clock value of the TSN DN may be obtained by subtracting O from a time of the local 5G system.

Meanwhile, the NW-TT on the UPF device may transmit the measured time offset O between the 5G clock domain and the TSN clock domain to the SMF device, such that the SMF device may perform mapping from the TSN clock domain to the 5G clock domain according to O, thereby converting the "burst arrival time" in the TSCAI from the time of the TSN clock domain to the time of the 5G clock domain.

After one time offset measurement is performed, the UPF device/the NW-TT continues to perform time offset measurement with the TSN DN to which the IMF device/the NW-TT is connected (i.e., the UPF device/the NW-TT continues to measure the time offset between the 5G clock domain and the TSN clock domain, to keep an error of O within an acceptable range). If the time offset measurement is not continuously performed, a relatively large time offset may occur between the 5G clock domain and the TSN clock domain after a period of time. As a result, the precise time control of the service is affected. In addition, the DS-TT may also continue to measure the time offset between the 5G clock domain and the TSN clock domain to keep the error of the time offset O between the 5G clock domain and the TSN clock domain within an acceptable range. In addition, the ES connected to the DS-TT may continue to measure a time offset between a local time of the ES and the TSN clock domain in which the TSN DN is located, a time value of the TSN DN may be obtained according to the measured O by subtracting O from the local time of the ES, and the obtained time value of the TSN DN is set as a time of the local clock of the ES, thereby achieving time synchronization between the ES and the TSN DN.

During the time offset measurement, messages (including the Sync message, the Follow_up message, the Delay_Req message, and the like) between the ES connected to the DS-TT and the TSN DN are transmitted through a particular QoS flow. As shown in FIG. 2, exchanging of a plurality of messages such as the Sync message, the Follow_up message, and the Delay_Req message exists in the time offset measurement process. It can be seen that the PTP/gPTP has a strong exchange characteristic, and the PTP/gPTP also defines a plurality of other functions such as a selection flow of clocks. When these functions are enabled, exchanging of more messages occurs in the time offset measurement process. As shown in FIG. 2, the PTP/gPTP message in the time offset measurement process has no periodicity (i.e., there is no fixed time interval between two messages), such that the QoS flow used for transmitting the PTP/gPTP message also has no periodicity. Therefore, the PTP/gPTP message in the synchronization process and the QoS flow used for transmitting the message belong to service data of an aperiodic TSC service in the TSN communication system. The aperiodic service data means that there is no fixed time interval between two adjacent data transmitted in the service. Based on completion of synchronization, a service data flow (SDF) in the TSN communication system belongs to a periodic TSC service. These periodic TSC services have high periodicity and data communication is performed strictly according to a periodic time. The periodic service data means that there is a fixed time interval kept between two adjacent data transmitted in a service, and the time interval is a period of the service data.

The TSN communication system sets the QoS flow according to a QoS requirement of the TSC service. A plurality of different TSC SDFs with the same QoS requirement may be mapped to the same QoS flow. A plurality of different TSC SDFs with the same QoS requirement may be alternatively mapped to different QoS flows. In addition, the TSN communication system supports a PDU connection service, the PDU connection service being a service for exchanging PDU packets between the UE and the TSN DN. The PDU connection service is implemented by the establishment of a PDU session initiated by the UE. After one PDU session is established, one data transmission channel between the UE and the TSN DN is established. One or more PDU sessions may be established between one UE and one TSN DN, one PDU session may include a plurality of TSC SDFs, and the plurality of TSC SDFs may be mapped to one or more QoS flows for data transmission.

One DS-TT may provide one or more first ports, and each first port is identified by using a respective media access control (MAC) address as a port number. Similarly, one NW-TT may provide one or more second ports, and each second port is identified by using a respective MAC address as a port number. The R16 standard of the 5G system may have the following limitations (1) to (3) on the port:
(1) One UE may be connected to a plurality of DS-TTs, but one DS-TT may be connected to only one UE, and only one port on one DS-TT is connected to the ES. Similarly, one UPF device may be connected to a plurality of NW-TTs, but one NW-TT may be connected to only one UPF device, and only one port on one NW-TT is connected to the ES.
(2) When one PDU session is established for the UE, one first port on a corresponding DS-TT and one second port on a corresponding NW-TT may be allocated for the PDU session to form one port pair (i.e., one PDU session is associated with only one port pair).
(3) When one QoS flow is established for the UE, one first port on a corresponding DS-TT and one second port on a corresponding NW-TT may be allocated for the QoS flow to form one port pair (i.e., one QoS flow corresponds to one port pair).

There are some problems in the process of implementing data transmission of a TSN based on the existing standard, and the following four problems are included.
(1) Problem 1a: After TSC SDFs of different periods are mapped to a QoS flow, a conflict between the QoS flow and a port pair is generated. Based on completion of synchronization, the TSC services in the TSN communication system have high periodicity and data communication is performed strictly according to a periodic time. The existing standard sets the QoS flow according to the QoS requirements of the TSC services. For example, when two TSC SDFs with different periods have the same QoS requirement, the two TSC SDFs may be mapped to the same QoS flow. If the two TSC SDFs of the different periods are mapped to the same QoS flow, the following three cases occur:
(i) Because the two TSC SDFs mapped to the same QoS flow do not have the same data transmission period, the CNC cannot configure a port pair for the QoS flow.
(ii) The CNC respectively configures the two TSC SDFs on different port pairs according to the different periods of the two TSC SDFs, such that the QoS flow to which the two TSC SDFs are mapped corresponds to two port pairs. This conflicts with the 5G existing standard because one QoS flow is to correspond to one port pair according to the R16 standard of the 5G system.
(iii) The CNC respectively configures the two TSC SDFs on different port pairs according to the different periods of the two TSC SDFs. However, according to the existing standard of the 5G system, the two SDFs may be alternatively mapped to different QoS flows, but because the two QoS flows have the same QoS requirement, the two QoS flows are associated with the same port pair, that is, the two QoS flows correspond to the same port pair, which similarly results in a conflict with the existing standard.
(2) Problem 1b: After an aperiodic TSC service and a periodic TSC service are mapped to the QoS flow, a conflict between the QoS flow and the port pair is generated. In the TSN communication system, in addition to periodic TSC SDF communication between the UE and the TSN DN, there is also aperiodic TSC service data communication such as a PTP/gPTP message, an address resolution protocol (ARP, which is a protocol that translates an IP address into an Ethernet MAC address) message, or an authentication or registration-related message. The existing standard sets the QoS flow according to the QoS requirements of the TSC services. If a periodic TSC SDF has the same QoS requirement as an aperiodic TSC SDF, the two TSC SDFs may be mapped to the same QoS flow. This results in three conflict cases as in the problem 1a
(3) Problem 2: When TSC SDFs of different periods occur, a risk of insufficient port pairs is generated. Theoretically, when a plurality of periodic TSC SDFs have the same period, the plurality of periodic TSC SDFs may share the same port pair. Having the same period may refer to exactly the same period, for example, both periods of two TSC SDFs are 4 microseconds (μs). Having the same period may alternatively refer to all periods having a greatest common divisor. For example, a period of one TSC SDF is 4 μs, a period of another TSC SDF is 6 μs, and a greatest common divisor thereof is 2 μs, such that it may be considered that the two TSC SDFs have the same period. However, it may occur that a plurality of TSC SDFs have the same period, and the same period is a greatest common divisor of all periods, but the greatest common divisor is too small in value to be supported. For example, periods of three TSC SDFs are 4 μs, 6 μs, and 9 μs respectively, and a greatest common divisor of the periods is 1 μs. It can be seen that the port does not support a scheduling period less than 2 μs according to actual product capabilities, such that the same port pair cannot be allocated for the three TSC SDFs. Therefore, to ensure a normal operation of the data transmission process, the CNC generally allocates only a plurality of TSC SDFs having exactly the same period to the same port pair, but a TSC service of one UE may include a plurality of TSC SDFs having different periods. In this way, the risk of insufficient port pairs is more likely to occur.

(4) Problem 3: Port pair allocation for ESs connected to a plurality of UE sides.

The problems 1a, 1b, 2 and 3 are for the same UE side. When the ESs of the plurality of UE sides are connected to the same DS-TT, a first port provided by the DS-TT is shared by devices of the plurality of UE sides. In this case, how to schedule the shared port for use (i.e., how to allocate different time slots on the shared port) without a conflict problem is not covered by the existing standard. Similarly, when the ESs of a plurality of UPF sides are connected to the same NW-TT, a second port provided by the NW-TT is also shared by the plurality of ESs. The existing standard also does not provide a good configuration solution for this case.

(5) Problem 4: A configuration among the PDU session, the QoS flow, and the port pair. According to the existing standard, one PDU session of one UE may include a plurality of TSC SDFs, and the plurality of TSC SDFs may be mapped to one or more QoS flows. The existing standard only supports a scenario where one PDU session may be associated with only one port pair (which includes one first port on one DS-TT and one second port on one NW-TT). However, if the PDU session includes a plurality of QoS flows with different periods and these QoS flows may be allocated to a plurality of port pairs, the PDU session is associated with the plurality of port pairs. This conflicts with the existing standard. Conversely, the current standard only supports that one PDU session includes a plurality of TSC SDFs with the same period, such that the plurality of TSC SDFs may be mapped to the same QoS flow, and then the same QoS flow is allocated to the same port pair. Alternatively, the plurality of TSC SDFs may be mapped to a plurality of QoS flows, but because all TSC SDFs in the plurality of QoS flows have the same period, the plurality of QoS flows may share the same port pair. That is, the existing standard does not support that one PDU session includes a plurality of TSC SDFs with different periods, and certainly does not involve a solution to resolve a case where one PDU session includes both a periodic TSC SDF and an aperiodic TSC SDF.

Aiming at the problems that exist in the process of implementing data transmission of a TSN based on the existing standard, the embodiments of the disclosure provide some improvements, which may include, but is not limited to, the improvements described below:

(1) Improvement 1: One PDI session is associated with a plurality of port pairs. Because in the R16 standard of the existing 5G system, one PDU session supports only one port pair, only data transmission of TSC SDFs with the same period in one PDU session is supported without supporting neither data transmission of TSC SDFs with different periods in one PDU session nor data transmission of both an aperiodic TSC SDF and a periodic TSC SDF in one PDU session (referring to the foregoing problem 4). In this embodiment of the disclosure, one PDU session is associated with a plurality of port pairs. An improvement is provided for the limitations on the port in the R16 standard in the existing 5G system, which may be as follows: one UE may be connected to a plurality of DS-TTs, one DS-TT may be alternatively connected to a plurality of UEs, and one or more ports provided by one DS-TT are connected to the ES. Similarly, one UPF device may be connected to a plurality of NW-TTs, one NW-TT may be alternatively connected to a plurality of UPF devices, and a plurality of ports provided by one NW-TT are connected to the ES.

(2) Improvement 2: One QoS flow corresponds to one port pair and an indication of a port may be required. One QoS flow corresponds to one port pair. Because the improvement is made for the limitations on the port in the existing standard in the disclosure, allocation of the ports is more flexible, but also has more sharing problems. Therefore, when a QoS flow is established for the UE and a corresponding port pair is allocated for the QoS flow, an indication may be further made to the DS-TT and the NW-TT (i.e., the UE may indicate, by using a mechanism, that the DS-TT transmits DL data to a port), and the UPF device may indicate, by using a mechanism, that the NW-TT transmits UL data to a port. For example, after the UPF device receives DL TSC data and transmits the DL TSC data to the UE through a QoS flow, the UE indicates, through a correspondence between the QoS flow and the port pair, that the DS-TT transmits the DL TSC data to the ES connected to the DS-TT side through a first port specified in a corresponding port pair. In another example, after the UE receives UL TSC data and transmits the UL TSC data to the UPF device through a QoS flow, the UPF device indicates, through a correspondence between the QoS flow and the port pair, that the NW-TT transmits the UL TSC data to the ES of the NW-TT side through a second port specified in a corresponding port pair.

(3) Improvement 3: A plurality of QoS flows of different ESs are associated with the same port (not the port pair). To avoid a risk of insufficient ports in the existing standard, the disclosure provides that different QoS flows of different ESs may be transmitted on one port, but the QoS flows of the different ESs may have the same TSC transmission period. Under the premise, the CNC is allowed to schedule the port (i.e., different time slots on one port are allocated for the plurality of QoS flows with the same period of the plurality of ESs). Otherwise, if the plurality of QoS flows of the different ESs have different periods, but are scheduled for transmission on the same port, there may be a transmission conflict.

Figure 3:
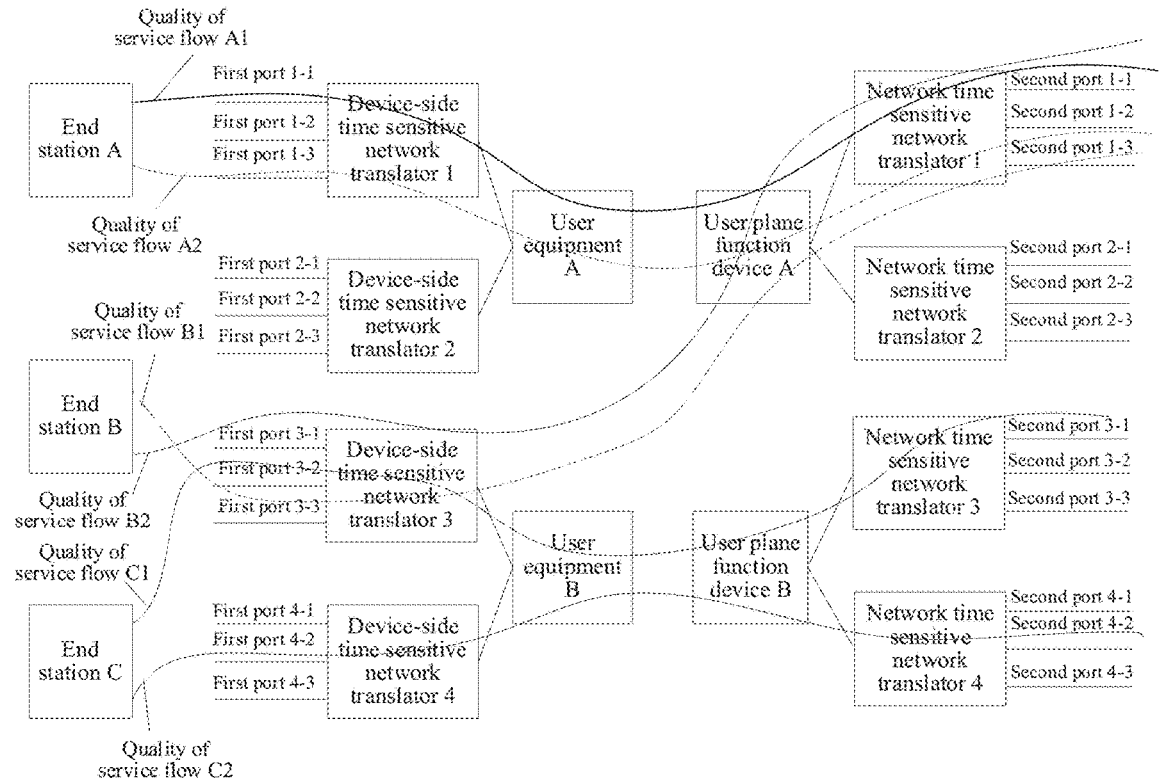
FIG. 3 is a diagram in which a plurality of quality of service (QoS) Flows of different end stations (ES) are associated with the same port according to an embodiment.

FIG. 3 is a diagram in which a plurality of QoS flows of different ESs are associated with the same port according to an embodiment. As shown in FIG. 3, a QoS flow-A2 of an ES-A uses a first port 1-3 on a DS-TT 1, and a QoS flow-B1 of an ES-B uses a first port 3-3 on a DS-TT 3, but the two QoS flows share a second port 1-3 on an NW-TT 1. A QoS flow-A1 of the ES-A uses a first port 1-1 on the DS-TT 1, and a QoS flow-B2 of the ES-B uses a first port 3-1 on the DS-TT 3, but the two QoS flows share a second port 1-1 on the NW-TT 1. The QoS flow-B2 of the ES-B and a QoS flow-C1 of an ES-C share the first port 3-1 on the DS-TT 3, but the QoS flow-B2 of the ES-B uses the second port 1-I on the NW-TT 1, and the QoS flow-C1 of the ES-C uses a second port 3-1 on an NW-TT 3.

One QoS flow corresponds to one port pair (i.e., two ports, including a first port on one DS-TT and a second port on one NW-TT). When QoS flows of two different ESs correspond to the same second port on one NW-TT, first ports on the DS-TT that correspond to the QoS flows are generally different (e.g., physical locations of the two ESs are far away from each other, and the two ESs cannot be connected to the same port on the same DS-TT). Certainly, the first port on the DS-TT that corresponds to the QoS flows may be alternatively the same (e.g., the physical locations of the two ESs are very close, and the two ESs may be simultaneously connected to the same port on the same DS-TT). Conversely, when QoS flows of two ESs having close physical locations correspond to the same port on the same DS-TT, the ports on the NW-TT that correspond to the QoS flows may be different. For example, the SMF device selects the NW-TT 1 on a UPF-A device for the ES-A and selects the NW-TT3 on a UPF-B device for the ES-B.

(4) Improvement 4: Cooperation between management of a periodic QoS flow and management of a port.

Figure 4:
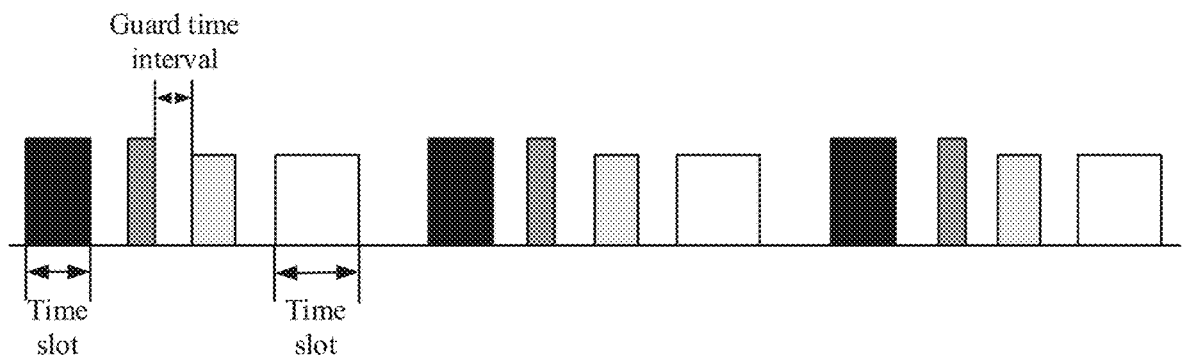
FIG. 4 is a diagram in which a plurality of QoS flows having the same period are transmitted on the same port according to an embodiment.

FIG. 4 is a diagram in which a plurality of QoS flows having the same period are transmitted on the same port according to an embodiment. The QoS flows may be QoS flows from different UEs, and the QoS flows may have periodicity and respectively occupy different transmission time slots on the same port. Lengths of blocks marked by different colors shown in FIG. 4 represent sizes of service data of a transmitted TSC SDF. A transmission duration (i.e., a size of a time slot) of the TSC SDF on the port depends on the size of the service data. A fixed time interval may be required between time slots represented by blocks of different colors, and the time interval is referred to as a transmission guard interval and used for transmission guard, which may prevent jitter of the transmission. If a collision occurs between a service data and an adjacent (back or front) service data, the two pieces of service data fail to be transmitted, and collision of adjacent service data may be avoided by using the transmission guard interval.

If a port further has an idle time interval in addition to the transmission time slot and the transmission guard interval, the idle time interval may be further used for transmitting more other QoS flows When a port has no idle time interval, that is, a capacity of the port is full, no transmission time slot may be allocated, and no other QoS flow may be transmitted on the port.

The TSC SDF of the UE may be mapped to the QoS flow for transmission. When the SMF device maps a TSC SDF of the UE to a QoS flow, the SMF device requests the CNC to allocate a port for the TSC SDF. The CNC allocates a port used for data transmission for the TSC SDF according to information (e.g., a period, a transmission delay, a data start time, and a data end time) about the TSC SDF, and then determines that the TSC SDF on the port is transmitted on which time slot. Therefore, when a TSC SDF in the QoS flow is deleted, or when the QoS flow is released (in this case, all TSC SDFs in the QoS flow are deleted), the SMF device may notify the CNC of information about the deleted TSC SDFs, such that the CNC may recover time slots corresponding to the TSC SDFs, and the recovered time slots may be allocated for other TSC SDFs for use.

(5) Improvement 5: Cooperation between management of an aperiodic QoS flow and management of a port. If a plurality of aperiodic TSC SDFs have the same QoS requirement, the plurality of aperiodic TSC SDFs may be mapped to the same QoS flow, and if the plurality of aperiodic TSC SDFs have different QoS requirements, the plurality of aperiodic TSC SDFs are respectively mapped to different QoS flows. An improvement may be as follows: a port pair (i.e., including one first port on one DS-TT and one second port on one NW-TT) is allocated to handle data transmission of an aperiodic QoS flow. By using the method, an aperiodic QoS flow and a periodic QoS flow may be processed separately, to avoid a mutual conflict problem of hybrid transmission of the periodic QoS flow and the aperiodic QoS flow on the same port aperiodic TSC SDF may occupy a transmission time slot of a periodic TSC SDF), thereby achieving parallel transmission and isolation of the aperiodic TSC SDF and the periodic TSC SDF.

Referring to Improvement 3 and FIG. 3, aperiodic QoS flows of different UEs may share two ports for transmitting the aperiodic QoS flows on a single-side or dual-side. That is, the aperiodic QoS flows of the different UEs may share only the first port on the DS-TT side, or share only the second port on the NW-TT side, or share the port pair.

Different from Improvement 4, the CNC does not allocate a time slot for the aperiodic TSC SDF. However, because each port has a limitation on transmission resources, when an aperiodic TSC SDF is deleted or when an aperiodic TSC SDF is deleted because a QoS flow in which the aperiodic TSC SDF is located is released, the CNC may be notified, and the CNC recovers and releases a transmission resource occupied by the aperiodic TSC SDF on a corresponding port. In this way, the CNC may allocate the recovered and released transmission resource to other aperiodic TSC SDFs of the same UE or aperiodic TSC SDFs of other UEs for data transmission.

Based on the above improvements, a detailed description of a method for implementing data transmission of a TSN provided by the embodiments of the disclosure is described below.

In accordance with the $3^{rd}$ generation partnership project (3GPP) standard, the 5G system may process ports provided by a DS-TT and an NW-TT in a PDU session management process of the UE. The PDU session management process of the UE may include a PDU session establishment process, a PDU session modification process, and a PDU session release process.

Figure 5:
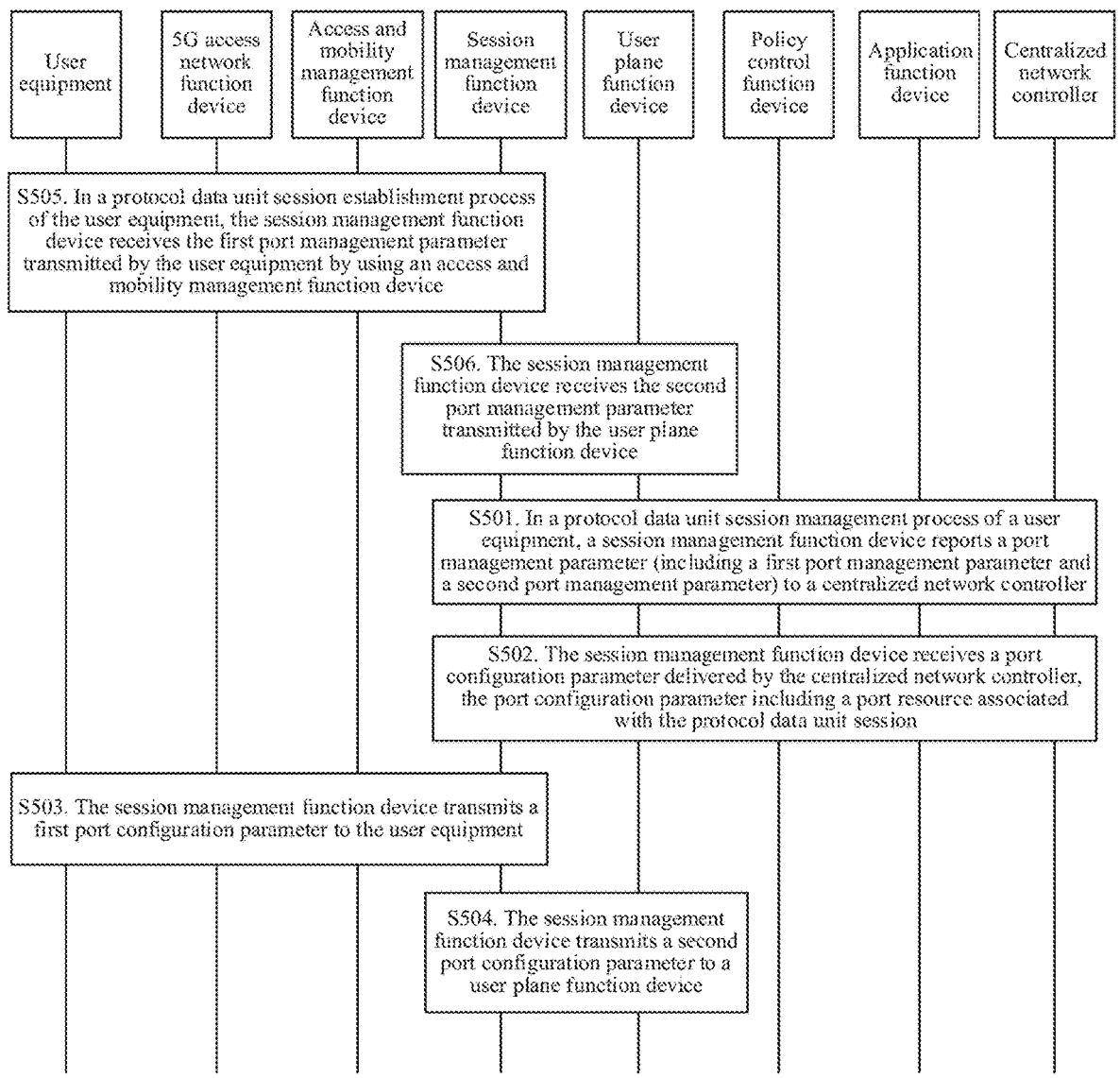
FIG. 5 is a flowchart of a method for implementing data transmission of a TSN according to an embodiment.

FIG. 5 is a flowchart of a method for implementing data transmission of a TSN according to an embodiment. The method may be used for describing processing of a port in a PDU session management process of a UE and includes the following operations S501 and S502.

In operation S501, in a PDU session management process of a UE, an SMF device reports a port management parameter to a CNC, the port management parameter including a UE ID, a first port list provided by a DS-TT connected to the UE, and a second port list provided by an NW-TT connected to a UPF device.

A process in which the SMF device reports the port management parameter to the CNC may include the following operations:

(1) The SMF device transmits a session management policy control update request (Npcf_SMPolicyControl_Update Request) to a PCF device, the Npcf_SMPolicyControl_Update Request including a port management container, the port management container carrying the port management parameter.

(2) The PCF device transmits an event report for performing a port management request (Event Report (Port Management Request)) to an AF device, the Event Report (Port Management Request) including a port management container, the port management container carrying the port management parameter.

(3) The AF device forwards the Event Report (Port Management Request) to the CNC.

The port management parameter includes a UE ID, a first port management parameter, and a second port management parameter, the first port management parameter including a first port list provided by the DS-TT connected to the UE, and the second port management parameter including a second port list provided by the NW-TT connected to the UPF device. The UE ID may be a MAC address of the UE. The port management parameter may include the UE ID, and the UE ID may correspond to the first port list provided by the DS-TT and the second port list provided by the NW-TT. The CNC records all the first port list and the second port list that corresponds to the UE ID. In this way, when port allocation is performed, the CNC may select a first port from the first port list and select a second port from the second port list according to the UE ID to form a port pair for allocation. For example, one first port is selected from the first port list corresponding to the UE ID and one second port is selected from the second port list corresponding to the UE ID to form a port pair, and the port pair is allocated to an aperiodic TSC SDF in a PDU session of the UE.

In operation S502, the SMF device receives a port configuration parameter delivered by the CNC, the port configuration parameter including a port resource associated with the PDU session.

A process in which the CNC delivers the port configuration parameter to the SMF device may include the following operations:

(1) The CNC delivers an event response for performing a port management response (Event Response (Port Management Response)) to the AF device, the Event Response (Port Management Response) including a port management container, the port management container carrying the port configuration parameter.

(2) the AF device forwards the Event Response (Port Management Response) to the PCF device.

(3) The PCF device transmits a session management policy control update response (Npcf_SMPolicyControl_Update Response) to the SMF device, where the Npcf_SMPolicyControl_Update Response including a port management container, and the port management container carrying the port configuration parameter.

The port configuration parameter may include a first port configuration parameter and a second port configuration parameter, the first port configuration parameter including a first port in the port resource, and the second port configuration parameter including a second port in the port resource. The port resource may include a plurality of port pairs, and one port pair includes one first port in the first port list provided by the DS-TT connected to the UE and one second port in the second port list provided by the NW-TT connected to the UPF device. That is, one PDU session of one UE is associated with a plurality of port pairs, and the plurality of port pairs are used for implementing data transmission of all TSC SDFs in the PDU session. The following cases (1) to (6) are included.

(1) When the PDU session of the UE includes an aperiodic TSC SDF, the SMF device reports the port management parameter further including a flag of the aperiodic TSC SDF to the CNC. After receiving the port management parameter reported by the SMF device, the CNC selects one first port from the first port list corresponding to the UE ID and selects one second port from the second port list corresponding to the UE ID, to form a port pair, and allocates the port pair to the aperiodic TSC SDF for implementing data transmission of the aperiodic TSC SDF. In this case, the port resource includes a port pair used for transmitting the aperiodic TSC SDF.

(2) When the PDU session of the UE includes a plurality of aperiodic TSC SDFs (e.g., TSC SDFs corresponding to the PTP/gPTP message), the plurality of aperiodic TSC SDFs share transmission resources of the same port pair. That is, a plurality of aperiodic TSC SDFs of the same UE may share the same port pair for data transmission.

(3) When the PDU session of the UE includes a periodic TSC SDF, the SMF device reports the port management parameter further including information about the periodic TSC SDF to the CNC, the information including a period, a transmission delay, a data start time, a data end time, and the like. After receiving the port management parameter reported by the SMF device, the CNC selects another first port (i.e., different from the first port used by the aperiodic TSC SDF) from the first port list corresponding to the UE ID, and selects another second port (i.e., different from the second port used by the aperiodic TSC SDF) from the second port list corresponding to the UE ID, to form a port pair, and allocates the port pair to the periodic TSC SDF for implementing data transmission of the periodic TSC SDF. In this case, the port resource further includes a port pair used for transmitting the periodic TSC SDF.

(4) The periodic TSC SDF may be mapped to a QoS flow, such that the QoS flow to which the periodic TSC SDF is mapped corresponds to the port pair allocated for the periodic TSC SDF, that is, one QoS flow corresponds to one port pair.

(5) When the PDU session of the UE includes a plurality of periodic TSC SDFs and the plurality of periodic TSC SDFs have the same period and the same QoS requirement, the plurality of periodic TSC SDFs are mapped to the same QoS flow and respectively occupy different time slots of the same port pair.

(6) When the PDU session of the UE includes a plurality of QoS flows and the plurality of QoS flows have the same period, the plurality of QoS flows share the same port pair but respectively occupy different time slots in the same port pair. In this case, the port resource may further include the shared same port pair and the different time slots that are respectively occupied in the shared same port pair and are used for transmitting the periodic TSC SDFs in the QoS flow.

In operation S503, the SMF device transmits a first port configuration parameter to the UE, such that the UE indicates a first port in the port resource to the DS-TT connected to the UE.

A process in which the SMF device transmits the first port configuration parameter to the UE may include the following operations (1) to (3):

(1) The SMF device transmits a communication message transfer (Namf_Communication_N1N2MessageTransfer (N1 SM container)) to an AMF device, the Namf_Communication_N1N2MessageTransfer (N1 SM container) including a port management information container, the port management information container carrying the first port configuration parameter.

(2) The AMF device forwards the Namf_Communication_N1N2MessageTransfer (N1 SM container) to an NG RAN.

(3) The NG RAN transmits an access network (AN) specific resource modification (SM) (AN-specific resource modification (N1 SM container)) to the UE, the AN-specific resource modification (N1 SM con- tainer) including a port management information container, the port management information container carrying the first port configuration parameter.

The UE makes an indication to a corresponding DS-TT according to a first port in the port resource in the first port configuration parameter. When an IP connection exists between the UE and the DS-TT, an indication manner of the UE to the DS-TT may include at least one of performing an indication by using an IP tunnel specified in the IP connection, performing an indication by using an identifier of the first port in the port resource, and performing an indication by using an IP address corresponding to the IP connection. One IP connection may include a plurality of IP tunnels, and one IP tunnel corresponds to one port number. The specified IP tunnel herein may refer to an IP tunnel corresponding to a port number of the first port in the port resource. When a non-IP connection exists between the UE and the DS-TT, the indication manner of the UE to the DS-TT may include performing an indication by using an identifier of a special L2 (a data link layer) or an identifier of a special L1 (a physical layer). The identifier of the special L2 herein may refer to another identifier different from an identifier of a conventional L2, and the identifier of the special L1 may refer to another identifier different from an identifier of a conventional L1.

In operation S504, the SMF device transmits a second port configuration parameter to the UPF device, such that the UPF device indicates a second port in the port resource to the NW-TT connected to the UPF device.

A process in which the SMF device transmits the second port configuration parameter to the UPF device may include the SMF device transmitting a session modification request (N4 session modification request) to the UPF device, where the N4 session modification request includes a port management information container, and the port management information container carries the second port configuration parameter.

The UPF device may makes an indication to a corresponding NW-TT according to a second port in the port resource in the second port configuration parameter. When an IP connection exists between the UPF device and the NW-TT, an indication manner of the UPF device to the NW-TT may include at least one of performing an indication by using an IP tunnel specified in the IP connection, performing an indication by using an identifier of the second port in the port resource, and performing an indication by using an IP address corresponding to the IP connection. One IP connection may include a plurality of IP tunnels, and one IP tunnel corresponds to one port number. The specified IP tunnel herein may refer to an IP tunnel corresponding to a port number of the second port in the port resource. When a non-IP connection exists between the UPF device and the NW-TT, the indication manner of the UPF device to the NW-TT may include performing an indication by using an identifier of a special L2 or an identifier of a special L1.

In one embodiment, the PDU session management process of the UE may include a PDU session establishment process of the UE. In this case, the port management parameter reported by the SMF device to the CNC in operation S501 further includes a residence time between the UE and each first port under the DS-TT, and the residence time is reported to the CNC, such that the CNC performs precise time control on the TSC service. In addition, the port configuration parameter received by the SMF device from the CNC in operation S502 is used for indicating that the CNC has allocated the port resource for the PDU session of the UE according to the port management parameter.

In operation S505, in a PDU session establishment process of the UE, the SMF device receives a first port management parameter transmitted by the UE by using an AMF device, the first port management parameter including a first port list provided by the DS-TT connected to the UE and a residence time between the UE and each first port under the DS-TT.

A process in which the SMF device receives the first port management parameter transmitted by the UE may include the following operations (1) and (2):
(1) The UE transmits a PDU session establishment request to an AMF device, the PDU session establishment request including a port management container, the port management container carrying the first port management parameter.
(2) The AMF device transmits a PDU session create session management context message (Nsmf_PDUSession_createSMcontext (N1 SM Container)) to the SMF device, the Nsmf_PDUSession_createSMcontext (N1 SM Container) including a port management container, the port management container carrying the first port management parameter.

In operation S506, the SMF device receives a second port management parameter transmitted by the UPF device, the second port management parameter including a second port list provided by the NW-TT connected to the UPF device.

A process in which the SMF device receives the second port management parameter transmitted by the UPF device may include the following operations (1) and (2):
(1) The SMF device transmits a session establishment request (N4 session establishment request) to the UPF device.
(2) The SMF device receives a session establishment response (N4 session establishment response) transmitted by the UPF device, the N4 session establishment response carrying the second port management parameter.

In this embodiment, that is, in the PDU session establishment process of the UE, the UE indicates a first port in the port resource to the DS-TT connected to the UE, such that the DS-TT may learn which first port under the DS-TT is allocated for data transmission. Therefore, when the UE receives DL TSC data transmitted by the UPF device, the DS-TT transmits the DL TSC data according to the indication by using the first port in the port resource. Similarly, the UPF device indicates a second port in the port resource to the NW-TT connected to the UPF device, such that the NW-TT may learn that which second port under the NW-TT is allocated for data transmission. Therefore, when the UPF device receives UL TSC data transmitted by the UE, the NW-TT transmits the UL TSC data according to the indication by using the second port in the port resource.

In another embodiment, the PDU session management process of the UE may include a PDU session modification process of the UE. When a part of service data in one PDU session of the UE changes, for example, a TSC SDF is newly added to an existing QoS flow or a QoS flow is newly added, or a TSC SDF is deleted or a QoS flow is deleted (in this case, all TSC SDFs in the QoS flow are deleted), all these changes trigger the PDU session modification process of the UE. In this case, the port management parameter reported by the SMF device to the CNC in operation S501 further includes information about the changed service data in the PDU session, and the information herein may include information such as a flag of the changed (newly added or deleted) TSC SDF, a transmission delay, a data start time, and a data end time. In addition, if the PDU session modification process is triggered due to the newly added TSC SDF, the port configuration parameter received by the SMF device from the CNC in operation S502 is used for indicating that the CNC allocates the port resource (e.g., time slots on a port pair and a port) for the newly added TSC SDF. In this case, the UE indicates a first port in the port resource to the DS-TT connected to the UE, such that the DS-TT may learn that which first port under the DS-TT is allocated for data transmission. Therefore, when the UE receives DL TSC data of the newly added TSC SDF transmitted by the UPF device, the DS-TT transmits the DL TSC data according to the indication by using the first port in the port resource. Similarly, the UPF device indicates a second port in the port resource to the NW-TT connected to the UPF device, such that the NW-TT may learn that which second port under the NW-TT is allocated for data transmission. Therefore, when the UPF device receives UL TSC data of the newly added TSC SDF transmitted by the UE, the NW-TT transmits the UL TSC data according to the indication by using the second port in the port resource.

If the PDU session modification process is triggered due to the deletion of one TSC SDF or one QoS flow, the port configuration parameter received by the SMF device from the CNC in operation S502 is used for indicating that the CNC has recovered the port resources used by the deleted TSC SDFs or all TSC SDFs in the deleted QoS flow. In this case, after the UE indicates the first port in the port resource to the DS-TT connected to the UE, the DS-TT learns according to the indication that the first port in the port resource has been recovered by the CNC, and the first port in the port resource is reallocated subsequently. Similarly, after the UPF device indicates the second port in the port resource to the NW-TT connected to the UPF device, the NW-TT learns according to the indication that the second port in the port resource has been recovered by the CNC, and the second port in the port resource is reallocated subsequently.

In another embodiment, the PDU session management process of the UE may include a PDU session release process of the UE. When a PDU session of the UE is released, all TSC SDFs and QoS flows included in the PDU session are deleted. In this case, the port management parameter reported by the SMF device to the CNC in operation S501 further includes a port resource associated with the PDU session, the port resource including a plurality of port pairs, the plurality of port pairs being port pairs allocated by the CNC for all TSC SDFs in the PDU session, One port pair includes one first port in the first port list provided by the DS-TT connected to the UE and one second port in the second port list provided by the NW-TT connected to the UPF device. In addition, the port configuration parameter received by the SMF device from the CNC in operation S502 is used for indicating that the CNC has recovered the port resource. That is, when the PDU session of the UE is released, the CNC recovers port pairs used by all TSC SDFs in the PDU session, and the recovered port pairs may be allocated to TSC SDFs of other PDU sessions of the UE or TSC SDFs of other UEs In this embodiment, after the UE indicates the first port in the port resource to the DS-TT connected to the UE, the DS-TT learns according to the indication that the first port in the port resource has been recovered by the CNC, and the first port in the port resource is reallocated subsequently. Similarly, after the UPF device indicates the second port in the port resource to the NW-TT connected to the UPF device, the NW-TT learns according to the indication that the second port in the port resource has been recovered by the CNC, and the second port in the port resource is reallocated subsequently.

In this embodiment of the disclosure, in a PDU session management process of a UE, an SMF device reports a port management parameter to a CNC, the port management parameter including a UE ID, a first port list provided by a DS-TT connected to the UE, and a second port list provided by an NW-TT connected to a UPF device. The reporting process herein may enable the CNC to timely and comprehensively master all port conditions in the PDU session management process of the UE, so as to effectively and comprehensively manage the ports. For example, port resources are allocated for an aperiodic service and/or a periodic service included in the PDU session of the UE, or allocated port resources are managed. In this way, a transmission conflict between aperiodic service data and periodic service data may be effectively resolved, and the ports may be well configured. In addition, the CNC delivers a port configuration parameter to the SMF device, such that the SMF device may learn configuration content of the port resource in time, which is beneficial to notifying the ports in the port resource to have good transmission preparation, thereby achieving data transmission of a TSN.

Figure 6:
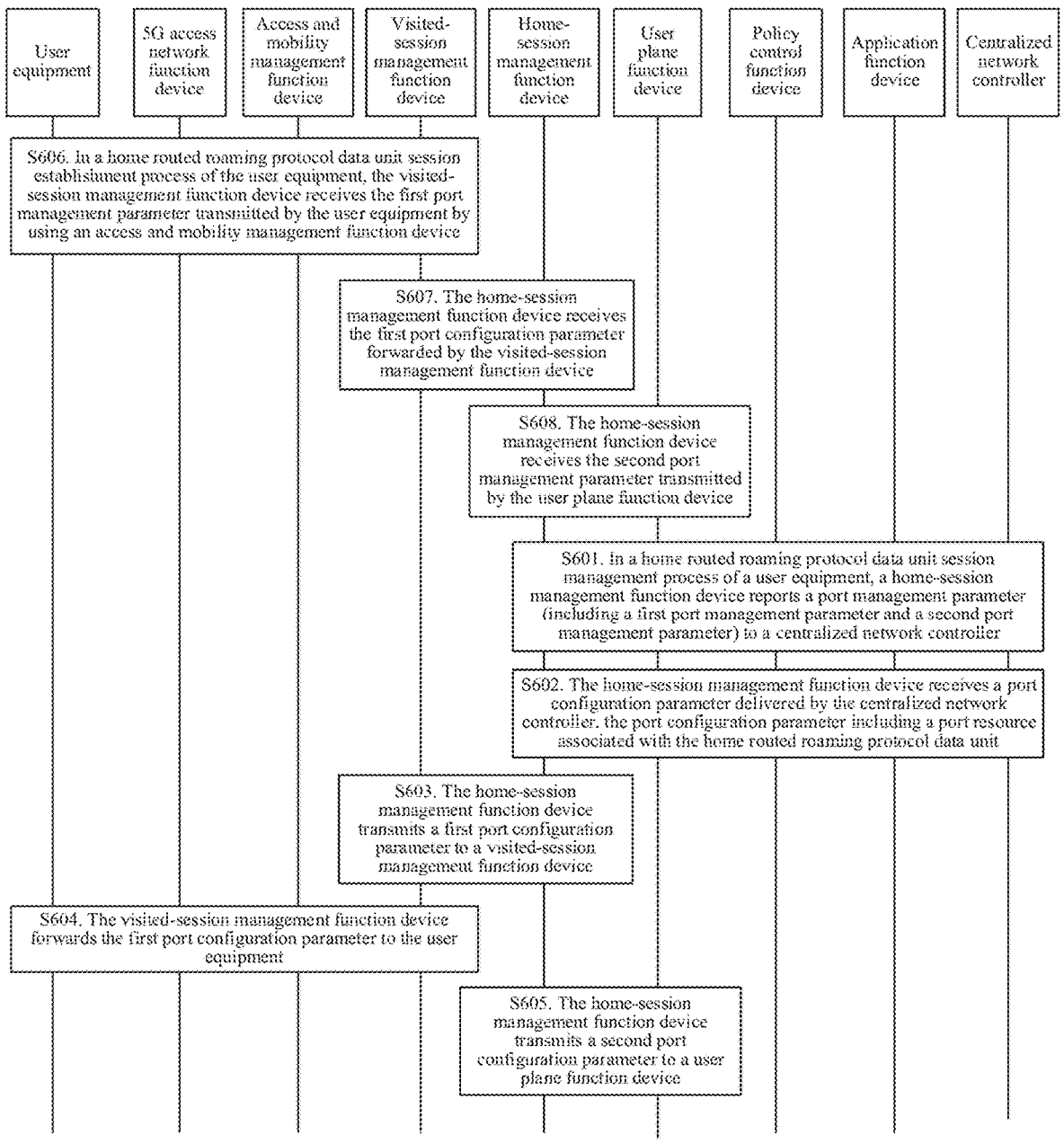
FIG. 6 is a flowchart of a method for implementing data transmission of a TSN according to an embodiment.

FIG. 6 is a flowchart of a method for implementing data transmission of a TSN according to an embodiment. The method is used for describing, when a PDU session of a UE is a home routed roaming (HR) PDU session, a port is managed in an HR PDU session management process of the UE. As shown in FIG. 6, the SMF device in this embodiment includes a visited-SMF (V-SMF) device and a home-SMF (H-SMF) device. The V-SMF device is responsible for processing a message transmitted by a UE/DS-TT through an AMF device; the H-SMF device is responsible for processing a message transmitted by a UPF device/NW-TT and interacting with a CNC; and transmission is performed between the V-SMF device and the H-SMF device, and main transmitted contents include a first port management parameter and a first port configuration parameter that are related to the UE/DS-TT. The method may include the following operations S601 and S602.

In operation S601, in an HR PDU session management process of a UE, an H-SMF device reports a port management parameter to a CNC, the port management parameter including a UE ID, a first port list provided by a DS-TT connected to the UE, and a second port list provided by an NW-TT connected to a UPF device.

In operation S602, the H-SMF device receives a port configuration parameter delivered by the CNC, the port configuration parameter including a port resource associated with the HR PDU session.

For operations S601 and S602 of the embodiment shown in FIG. 6, reference may be made to operations S501 and S502 of the embodiment shown in FIG. 5. The difference lies in that, in the embodiment shown in FIG. 6, a port is processed in the HR PDU session management process of the UE, but in the embodiment shown in FIG. 5, a port is processed in the PDU session management process of the UE. In addition, in the embodiment shown in FIG. 6, the H-SMF device interacts with the CNC, while in the embodiment shown in FIG. 5, the SMF device interacts with the CNC.

In an embodiment, the method of the embodiment shown in FIG. 6 further includes the following operations S603 to S605.

In operation S603, the H-SMF device transmits a first port configuration parameter to a V-SMF device.

The H-SMF device transmits a session management policy control update response (Npcf_SMPolicyControl_Update Response) to the V-SMF device, the Npcf_SMPolicyControl_Update Response including a port management container, the port management container carrying the first port configuration parameter.

In operation S604, the V-SMF device forwards the first port configuration parameter to the UE, such that the UE indicates a first port in the port resource to the DS-TT connected to the UE. For operation S604, reference may be made to operation S503 of the embodiment shown in FIG. 5. The difference lies in that, in operation S604, the V-SMF device transmits the first port configuration parameter to the UE, but in operation S503 shown in FIG. 5, the SMF device transmits the first port configuration parameter to the UE.

In operation S605, the H-SMF device transmits a second port configuration parameter to the UPF device, such that the UPF device indicates a second port in the port resource to the NW-TT connected to the UPF device. For operation S605, reference may be made to operation S504 of the embodiment shown in FIG. 5. The difference lies in that, in operation S605, the H-SMF device transmits the second port configuration parameter to the UPF device, but in operation S504 shown in FIG. 5, the SMF device transmits the second port configuration parameter to the UPF device.

In another embodiment, the HR PDU session management process of the UE may include an HR PDU session establishment process of the UE. In this case, the port management parameter reported by the H-SMF device to the CNC in operation S601 further includes a residence time between the HE and each first port under the DS-TT, and the residence time is reported to the CNC, such that the CNC performs precise time control on the TSC service. In addition, the port configuration parameter received by the H-SMF device from the CNC in operation S602 is used for indicating that the CNC has allocated the port resource for the HR PDU session of the UE according to the port management parameter.

In this embodiment, the method further includes the folk operations S606 to S608.

In operation S606, in an HR PDU session establishment process of the UE, the V-SMF device receives a first port management parameter transmitted by the UE by using an AMF device. For operation S606, reference may be made to operation S505 of the embodiment shown in FIG. 5. The difference lies in that, in operation S606, the V-SMF device receives the first port management parameter transmitted by the UE, but in operation S505 shown in FIG. 5, the SMF device receives the first port management parameter transmitted by the UE.

In operation S607, the H-SMF device receives the first port management parameter forwarded by the V-SMF device, the first port management parameter including a first port list provided by the DS-TT connected to the UE and a residence time between the UE and each first port under the DS-TT.

A process in which the H-SMF device receives the first port management parameter forwarded by the V-SMF device may include the H-SMF device receiving a session management policy control update request (Npcf-SMPolicyControl_Update Request) transmitted by the V-SMF device, where the Npcf-SMPolicyControl_Update Request includes a port management container, and the port management container carries the first port management parameter.

In operation S608, the H-SMF device receives a second port management parameter transmitted by the UPF device, the second port management parameter including a second port list provided by the NW-TT connected to the UPF device. For operation S608, reference may be made to operation S506 of the embodiment shown in FIG. 5. The difference lies in that, in operation S608, the H-SMF device receives the second port management parameter transmitted by the UPF device, but in operation S506 shown in FIG. 5, the SMF device receives the second port management parameter transmitted by the UPF device.

In this embodiment, that is, in the HR PDU session establishment process of the UE, the UE indicates a first port in the port resource to the DS-TT connected to the UE, such that the DS-TT may learn that which first port under the DS-TT is allocated for data transmission. Therefore, when the UE receives DL TSC data transmitted by the UPF device, the DS-TT transmits the DL TSC data according to the indication by using the first port in the port resource. Similarly, the UPF device indicates a second port in the port resource to the NW-TT connected to the UPF device, such that the NW-TT may learn that which second port under the NW-TT is allocated for data transmission. Therefore, when the IMF device receives UL TSC data transmitted by the UE, the NW-TT transmits the UL TSC data according to the indication by using the second port in the port resource.

In another embodiment, the HR PDU session management process of the UE may include an HR PDU session modification process of the UE. When a part of service data in one HR PDU session of the UE changes, for example, a TSC SDF is newly added to an existing QoS flow or a QoS flow is newly added, or a TSC SDF is deleted or a QoS flow is deleted (in this case, all TSC SDFs in the QoS flow are deleted), all these changes trigger the HR PDU session modification process of the UE. In this case, the port management parameter reported by the H-SMF device to the CNC in operation S601 further includes information about the changed service data in the HR PDU session, and the information herein may include information such as a flag of the changed (newly added or deleted) TSC SDF, a transmission delay, a data start time, and a data end time. In addition, if the HR PDU session modification process is triggered due to the newly added TSC SDF, the port configuration parameter received by the H-SMF device from the CNC in operation S602 is used for indicating that the CNC allocates the port resource for the newly added TSC SDF. In this case, the UE indicates a first port in the port resource to the DS-TT connected to the UE, such that the DS-TT may learn that which first port under the DS-TT is allocated for data transmission. Therefore, when the UE receives DL TSC data of the newly added TSC SDF transmitted by the UPF device, the DS-TT transmits the DL TSC data according to the indication by using the first port in the port resource. Similarly, the UPF device indicates a second port in the port resource to the NW-TT connected to the UPF device, such that the NW-TT may learn that which second port under the NW-TT is allocated for data transmission. Therefore, when the UPF device receives UL TSC data of the newly added TSC SDF transmitted by the UE, the NW-TT transmits the UL TSC data according to the indication by using the second port in the port resource.

If the HR PDU session modification process is triggered due to the deletion of one TSC SDF or one QoS flow, the port configuration parameter received by the H-SMF device from the CNC in operation S602 is used for indicating that the CNC has recovered the port resources used by the deleted TSC SDFs or all TSC SDFs in the deleted QoS flow. In this case, after the UE indicates the first port in the port resource to the DS-TT connected to the UE, the DS-TT learns according to the indication that the first port in the port resource has been recovered by the CNC, and the first port in the port resource is reallocated subsequently. Similarly, after the UPF device indicates the second port in the port resource to the NW-TT connected to the UPF device, the NW-TT learns according to the indication that the second port in the port resource has been recovered by the CNC, and the second port in the port resource is reallocated subsequently.

In another embodiment, the HR PDU session management process of the UE may include an HR PDU session release process of the UE. When an HR PDU session of the UE is released, all TSC SDFs and QoS flows included in the HR PDU session are deleted. In this case, the port management parameter reported by the H-SMF device to the CNC in operation S601 further includes a port resource associated with the HR PDU session, the port resource including a plurality of port pairs, the plurality of port pairs being port pairs allocated by the CNC for all TSC SDFs in the HR PDU session. One port pair includes one first port in the first port list provided by the DS-TT connected to the UE and one second port in the second port list provided by the NW-TT connected to the UPF device. In addition, the port configuration parameter received by the H-SMF device from the CNC in operation S602 is used for indicating that the CNC has recovered the port resource. That is, when the HR PDU session of the UE is released, the CNC recovers the port pairs used by all TSC SDFs in the HR PDU session, and the recovered port pairs may be allocated to TSC SDFs of other PDU sessions of the UE or TSC SDFs of other UEs.

In this embodiment, after the UE indicates the first port in the port resource to the DS-TT connected to the UE, the DS-TT learns according to the indication that the first port in the port resource has been recovered by the CNC, and the first port in the port resource is reallocated subsequently. Similarly, after the UPF device indicates the second port in the port resource to the NW-TT connected to the UPF device, the NW-TT teams according to the indication that the second port in the port resource has been recovered by the CNC, and the second port in the port resource is reallocated subsequently.

In this embodiment of the disclosure, in an HR PDU session management process of a UE, an H-SMF device reports a port management parameter to a CNC, the port management parameter including a UE ID, a first port list provided by a DS-TT connected to the UE, and a second port list provided by an NW-TT connected to a UPF device. The reporting process herein may enable the CNC to timely and comprehensively master all port conditions in the HR PDU session management process of the UE, so as to effectively and comprehensively manage the ports. For example, port resources are allocated for an aperiodic service and/or a periodic service included in the HR PDU session of the UE, or allocated port resources are managed. In this way, a transmission conflict between aperiodic service data and periodic service data may be effectively resolved, and the ports may be well configured. In addition, the CNC delivers a port configuration parameter to the SMF device, such that the SMF device may learn configuration content of the port resource in time, which is beneficial to notifying the ports in the port resource to have good transmission preparation, thereby achieving data transmission of a TSN.

Figure 7:
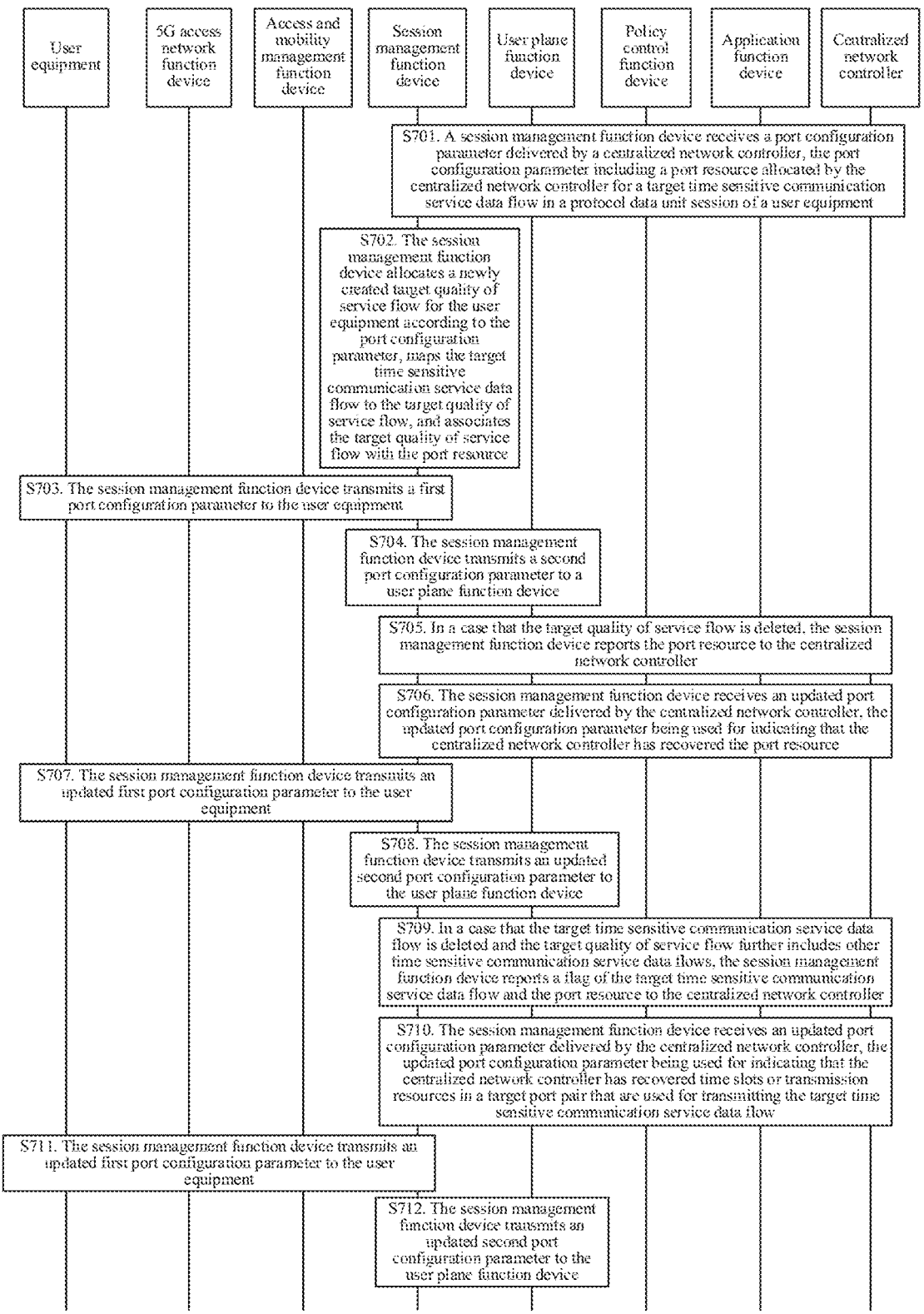
FIG. 7 is a flowchart of a method for implementing data transmission of a TSN according to an embodiment.

FIG. 7 is a flowchart of a method for implementing data transmission of a TSN according to an embodiment. The method may be used for describing management of a port when a QoS flow is newly created for a UE and includes the following operations S701 and S702.

In operation S701, an SMF device receives a port configuration parameter delivered by a CNC, the port configuration parameter including a port resource allocated by the CNC for a target TSC SDF in a PDU session of a UE.

A process in which the SMF device receives the port configuration parameter delivered by the CNC may include the following operations (1) to (3):

(1) The CNC transmits service information to an AF device, the service information including a port management container, the port management container carrying the port configuration parameter. In addition, the service information further includes a UE ID and information about the target TSC SDF, and the information herein may include a period, a transmission delay, a data start time, a data end time, and the like.

(2) The AF device transmits a policy authorization create/update request (Npcf_PolicyAuthorization_Create/Update Request) to a PCF device, the Npcf_PolicyAuthorization_Create/Update Request including a port management container, the port management container carrying the port configuration parameter. In addition, the Npcf_PolicyAuthorization_Create/Update Request further includes the UE ID and the information about the target TSC SDF.

(3) The PCF device transmits a session management policy control update notify response (Npcf_SMPolicyControl_Update Notify Response) to the SMF device, the Npcf_SMPolicyControl_Update Notify Response including a port management container, the port management container carrying the port configuration parameter. The Npcf_SMPolicyControl_Update Notify Response further includes the information about the target TSC SDF.

In operation S702, the SMF device allocates a newly created target QoS flow for the UE according to the port configuration parameter, maps the target TSC SDF to the target QoS flow, and associates the target QoS flow with the port resource.

The SMF device records a port management parameter of the UE, and the CNC also records the port management parameter of the UE. The port management parameter includes the UE ID, a first port management parameter, and a second port management parameter. The first port management parameter includes a first port list provided by a DS-TT connected to the UE and a residence time between the UE and each first port under the DS-TT; and the second port management parameter includes a second port list provided by an NW-TT connected to a UPF device. The port configuration parameter includes a first port configuration parameter and a second port configuration parameter, the first port configuration parameter including a first port in the port resource, and the second port configuration parameter including a second port in the port resource. The SMF device further records a port pair associated with an existing QoS flow of the UE. One port pair includes one first port in the first port list and one second port in the second port list. One existing QoS flow is associated with one port pair. When the existing QoS flow is a periodic QoS flow, two or more existing QoS flows having the same period share the same port pair and respectively occupy different time slots in the same port pair. Alternatively, when the existing QoS flow is an aperiodic QoS flow, two or more existing QoS flows share the same port pair and respectively occupy different transmission resources in the same port pair.

For a target TSC SDF, the CNC allocates a target port pair (a port number of one first port on the DS-TT and a port number of one second port on the NW-TT) for the target TSC SDF. If the target TSC SDF is periodic service data, the CNC further allocates related configuration parameters such as time slots used for transmitting the target TSC SDF in two ports of the target port pair, and the port resource includes the target port pair and the time slots that are occupied in the target port pair and are used for transmitting the target TSC SDF. If the target TSC SDF is aperiodic service data, the CNC allocates related configuration parameters such as transmission resources used for transmitting the target TSC SDF in the two ports of the target port pair for the target TSC SDF, and the port resource includes the target port pair and the transmission resources that are occupied in the target port pair and are used for transmitting the target TSC SDF. After the configuration is completed, the CNC transmits the port configuration parameter allocated for the target TSC SDF to the SMF device. If a periodic requirement or a QoS requirement of the target TSC SDF is different from that of the existing QoS flow of the UE, that is, the target TSC SDF cannot be mapped to the existing QoS flow, the SMF device newly creates a target QoS flow for the target TSC SDF, maps the target TSC SDF to the newly created target QoS flow, and associates the newly created QoS flow with the target port pair allocated by the CNC for the target TSC SDF. If the target TSC SDF is periodic service data, the target TSC SDF occupies a time slot on each port in the target port pair, and if the target TSC SDF is aperiodic service data, the target TSC SDF occupies a transmission resource on each port in the target port pair.

A plurality of periodic QoS flows of the same UE may share the same port pair provided that the periodic QoS flows have the same period. Similarly, periodic QoS flows of different UEs may also share the same port pair provided that the periodic QoS flows have the same period. Because the CNC may learn whether a capacity of each port has been maximum, another port pair is allocated when a capacity of one port pair has been maximum (i.e., no idle time slot on the port pair may be allocated). That is, if a capacity of a port in a port pair used by a QoS flow has been maximum, another port pair may be selected for the QoS flow, and the newly selected port pair may also be used for sharing.

In a embodiment, the method of this embodiment further may include the following operations (1) and (2), and operation (1) may be performed before operation S702.
(1) The SMF device determines whether the target port pair is the port pair that is recorded by the SMF device and is associated with the existing QoS flow, and if a result of the determining is no, operation S702 is performed.
(2) If the result of the determining is yes, the SMF device maps the target TSC SDF to the existing QoS flow and updates information about the existing QoS flow, the updating process herein including adding the information about the target TSC SDF to the existing QoS flow.

If the target port pair is the port pair that is recorded by the SMF device and is associated with the existing QoS flow, it indicates that data transmission may be performed on the target TSC SDF by using the port pair associated with the existing QoS flow and it further indicates that the target TSC SDF has the same periodicity requirement and the same QoS requirement as the existing QoS flow, and the target TSC SDF may be mapped to the existing QoS flow. Conversely, if the target port pair is not the port pair that is recorded by the SMF device and is associated with the existing QoS flow, it indicates that data transmission cannot be performed on the target TSC SDF by using the port pair associated with the existing QoS flow and a new port pair may be required for data transmission; and it further indicates that the target TSC SDF and the existing QoS flow have different periodicity requirements or different QoS requirements, and the target TSC SDF cannot be mapped to the existing QoS flow. The SMF device may newly create only a QoS flow for the UE and map the target TSC SDF to the newly created QoS flow.

In another embodiment, the method of this embodiment further includes the following operations S703 and S704.

In operation S703, the SMF device transmits a first port configuration parameter to the UE, such that the UTE indicates a first port in the port resource to the DS-TT connected to the UE.

A process in which the SMF device transmits the first port configuration parameter to the UE may include the following operations (1) to (3):
(1) The SMF device transmits a communication message transfer (Namf_Communication_N1N2MessageTransfer (N1 SM container)) to an AMF device, the Namf_Communication_N1N2MessageTransfer (N1 SM container) including a port management information container, the port management information container carrying the first port configuration parameter.
(2) The AMF device forwards the Namf_Communication_N1N2MessageTransfer (N1 SM container) to an NG RAN.
(3) The NG RAN transmits an access network specific resource modification (AN-specific resource modification (N1 SM container)) to the UE, the AN-specific resource modification (N1 SM container) including a port management information container, the port management information container carrying the first port configuration parameter.

The UE notifies, according to a first port in the port resource in the first port configuration parameter, that a port number of which first port under which DS-TT is used for data transmission of the TSC SDF. When an IP connection exists between the UE and the DS-TT, an indication manner of the UE to the DS-TT may include at least one of performing an indication by using an IP tunnel specified in the IP connection, performing an indication by using an identifier of the first port in the port resource, and performing an indication by using an IP address corresponding to the IP connection. One IP connection includes a plurality of IP tunnels, and one IP tunnel corresponds to one port number. The specified IP tunnel herein may refer to an IP tunnel corresponding to a port number of the first port in the port resource. When a non-IP connection exists between the UE and the DS-TT, the indication manner of the UE to the DS-TT may include performing an indication by using an identifier of a special L2 (a data link layer) or an identifier of a special L1 (a physical layer). The identifier of the special L2 herein may refer to another identifier different from an identifier of a conventional L2, and the identifier of the special L1 may refer to another identifier different from an identifier of a conventional L1.

In operation S704, the SMF device transmits a second port configuration parameter to the UPF device, such that the UPF device indicates a second port in the port resource to the NW-TT connected to the UPF device.

A process in which the SMF device transmits the second port configuration parameter to the UPF device may include the SMF device transmitting a session modification request (N4 session modification request) to the UPF device, where the N4 session modification request includes a port management information container, and where the port management information container carries the second port configuration parameter.

The UPF device notifies, according to a second port in the port resource in the second port configuration parameter, that a port number of which second port under which NW-TT is used for data transmission of the TSC SDF. Then an IP connection exists between the UPF device and the NW-TT, an indication manner of the UPF device to the NW-TT includes at least one of performing an indication by using an IP tunnel specified in the IP connection, performing an indication by using an identifier of the second port in the port resource, and performing an indication by using an IP address corresponding to the IP connection. One IP connection includes a plurality of IP tunnels, and one IP tunnel corresponds to one port number. The specified IP tunnel herein may refer to an IP tunnel corresponding to a port number of the second port in the port resource. When a non-IP connection exists between the UPF device and the NW-TT, the indication manner of the UPF device to the NW-TT may include performing an indication by using an identifier of a special L2 or an identifier of a special L1.

In another embodiment, the method of this embodiment further includes the following operations S705 and S705.

In operation S705, the SMF device reports the port resource to the CNC when the target QoS flow is deleted.

A process in which the SMF device reports the port resource to the CNC may include the following operations (1) to (3):

(1) The SMF device transmits a session management policy control update request (Npcf_SMPolicyControl_Update Request (rule Reports (QoS flow Termination)) to a PCF device, the Npcf_SMPolicyControl_Update Request (rule Reports (QoS flow Termination)) including a port management container, the port management container carrying the port resource. In addition, the port management container further includes information about deleted TSC SDFs (i.e., all TSC SDFs in the target QoS flow).

(2) The PCF device transmits a policy authorization notify request (Npcf_PolicyAuthorization_Notify Request (TSC SDF Released)) to an AF device, the Npcf_PolicyAuthorization_Notify Request (TSC SDF Released) including a port management container, the port management container carrying the port resource.

(3) The AF device transmits a notify request (Notify_Request (TSC SDF Released)) to the CNC, the Notify_Request (TSC SDF Released) including a port management container, the port management container carrying the port resource.

In operation S706, the SMF device receives an updated port configuration parameter delivered by the CNC, the updated port configuration parameter being used for indicating that the CNC has recovered the port resource.

As described above, after allocating a target port pair to a new periodic target TSC SDF, the CNC delivers a port configuration parameter to the SMF device. The SMF device newly creates a target QoS flow, maps the target TSC SDF to the newly created target QoS flow, and associates the newly created target QoS flow with the target port pair. Therefore, when the target QoS flow is deleted, the target TSC SDF in the target QoS flow is also deleted, and the SMF device may notify the PCF device/AF device/CNC. The CNC recovers the target port pair allocated for the target TSC SDF in the target QoS flow, updates the port configuration parameter, and then transmits the updated port configuration parameter to the AF device/PCF device/SMF device. The process herein is also applicable to a case in which an aperiodic QoS flow is deleted. When an aperiodic QoS flow is deleted, the SMF device also may notify the PCF device/AF device/CNC. Because the CNC has a plan for all transmission resources of the target port pair, when an aperiodic QoS flow of one UE is deleted, the CNC updates transmission resources of two ports allocated for the aperiodic QoS flow and releases the transmission resources of the ports occupied by the aperiodic QoS flow. The released transmission resources may be allocated to other UEs, or to a subsequent aperiodic QoS flow of the UE.

In this embodiment, the method further includes the following operations S707 and S708.

In operation S707, the SMF device transmits an updated first port configuration parameter to the UE, such that the UE indicates that the port resource has been recovered to the DS-TT connected to the UE.

In operation S708, the SMF device transmits an updated second port configuration parameter to the UPF device, such that the UPF device indicates that the port resource has been recovered to the NW-TT connected to the UPF device.

In another embodiment, the method of this embodiment further includes the following operations S709 and S710.

In operation S709, the SMF device reports a flag of the target TSC SDF and the port resource to the CNC when the target TSC SDF is deleted and the target QoS flow further includes other TSC SDFs.

In operation S710, the SMF device receives an updated port configuration parameter delivered by the CNC, the updated port configuration parameter being used for indicating that the CNC has recovered time slots or transmission resources in the target port pair that are used for transmitting the target TSC SDF.

In this embodiment, if only the target TSC SDF in the target QoS flow is deleted and there are other TSC SDFs in the target QoS flow, that is, the target QoS flow is not deleted, the SMF device may notify the CNC. If the target TSC SDF is periodic service data, the CNC recovers the time slots in the target port pair that are allocated for the target TSC SDF, updates the port configuration parameter, and then transmits the updated port configuration parameter to the SMF device. If the target TSC SDF is aperiodic service data, the CNC recovers the transmission resources in the target port pair that are allocated for the target TSC SDF, updates the port configuration parameter, and then transmits the updated port configuration parameter to the SMF device.

In this embodiment, the method further includes the following operations S711 and S712.

In operation S711, the SMF device transmits an updated first port configuration parameter to the UE, such that the UE indicates that the time slots or the transmission resources used for transmitting the target TSC SDF in the target port pair involved in the port resource have been recovered to the DS-TT connected to the UE.

In operation S712, the SMF device transmits an updated second port configuration parameter to the UPF device, such that the UPF device indicates that the time slots or the transmission resources used for transmitting the target TSC SDF in the target port pair involved in the port resource to the NW-TT connected to the UPF device.

In this embodiment of the disclosure, when processes of newly adding a TSC SDF, newly creating a target QoS flow, deleting the target QoS flow, deleting a target TSC SDF, and the like occur on a PDU session of a UE, a CNC updates a configuration of a port resource of the PDU session of the UE, including allocating a time slot or a transmission resource of a port, recovering a port pair, recovering the time slot or the transmission resource of the port, and the like, updates a port configuration parameter, and delivers the updated port configuration parameter to an SMF device. In this way, the SMF device may learn configuration content of the port resource in time, which is beneficial to notifying a corresponding port in the port resource, thereby achieving the effective management of the port, avoiding problems of poor configuration, a transmission conflict, and the like, and ensuring smooth data transmission of a TSN.

The embodiment shown in FIG. 7 relates to a process of newly creating and deleting a target QoS flow and also relates to a process of newly adding and deleting a target TSC SDF. As described above, such a process causes a part of service data in a PDU session of a UE to change, thereby triggering a PDU session modification process of the UE. Therefore, the embodiment shown in FIG. 7 actually discloses a processing solution for a port in the PDU session modification process of the UE. For an HR PDU session modification process of the UE, reference may be made to the process shown in FIG. 7, and different from FIG. 7, in the HR PDU session modification process, an H-SMF device interacts with the CNC, a UPF device, a PCF device, an AF device, and a V-SMF device interacts with the UE, an NG RAN, and an AMF device. The V-SMF device also interacts with the H-SMF device, and interaction content thereof relates to relevant content of a first port on a UE/DS-TT side, such as a first port management parameter and a first port configuration parameter.

Figure 8:
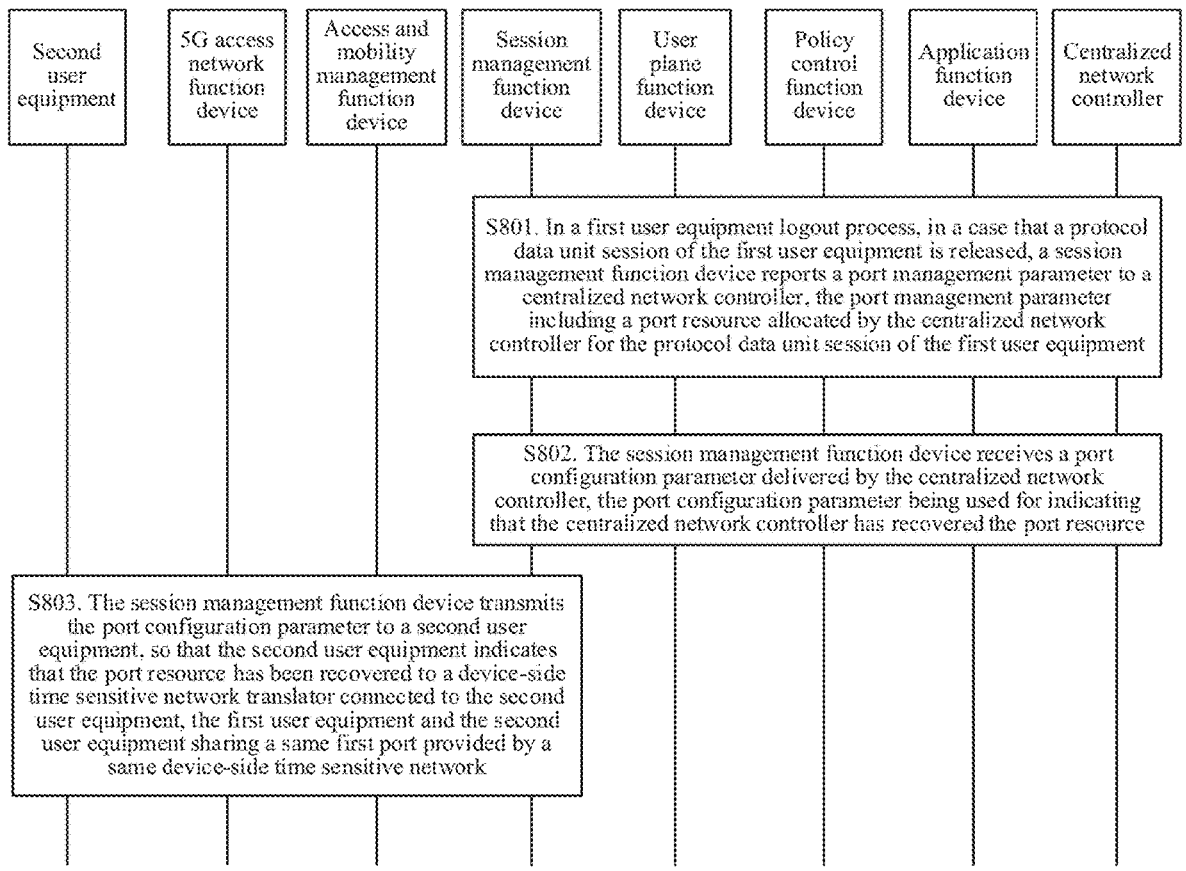
FIG. 8 is a flowchart of a method for implementing data transmission of a TSN according to an embodiment.

FIG. 8 is a flowchart of a method for implementing data transmission of a TSN according to an embodiment. The method is used for describing management of a port when a UE is powered off or is disconnected from a network and includes the following operations S801 to S803.

In operation S801, in a first UE logout process, an SMF device reports a port management parameter to a CNC when a PDU session of the first UE is released, the port management parameter including a port resource allocated by the CNC for the PDU session of the first UE.

A process in which the SW device reports the port management parameter to the CNC may include the following operations (1) to (3):

(1) The SMF device transmits a session management policy session termination (Npcf_SMPolicy Association Termination) to a PCF device, the Npcf_SMPolicy Association Termination) including a port management container, the port management container carrying the port management parameter.

(2) The PCF device transmits a policy authorization notify request (Npcf_PolicyAuthorization_Notify Request (TSC SDF Released)) to an AF device, the Npcf_PolicyAuthorization_Notify Request (TSC SDF Released) including a port management container, the port management container carrying the port management parameter.

(3) The AF device transmits a notify request (Notify_Request (TSC SDF Released)) to the CNC, the Notify_Request (TSC SDF Released) including a port management container, the port management container carrying the port management parameter.

In operation S802, the SMF device receives a port configuration parameter delivered by the CNC, the port configuration parameter being used for indicating that the CNC has recovered the port resource.

A process in which the SMF device receives the port configuration parameter delivered by the CNC may include the following operations (1) to (3):

(1) The CNC delivers a notify response (Notify_Response) to an AF device, the Notify_Response including a port management container, the port management container carrying the port configuration parameter.

(2) The AF device transmits a policy authorization notify response (Npcf_PolicyAuthorization_Notify Response) to a PCF device, the Npcf_PolicyAuthorization_Notify Response including a port management container, the port management container carrying the port configuration parameter.

(3) The PCF device transmits a session management policy control delete response (Npcf_SMPolicyControl_Delete Response) to the SMF device, the Npcf_SMPolicyControl_Delete Response including a port management container, the port management container carrying the port configuration parameter.

In operation S803, the SMF device transmits the port configuration parameter to a second UE, such that the second UE indicates that the port resource has been recovered to a DS-TT connected to the second UE, the first UE and the second UE sharing the same first port provided by the same DS-TT.

The port configuration parameter includes a first port configuration parameter and a second port configuration parameter, the first port configuration parameter including a first port in the port resource, and the second port configuration parameter including a second port in the port resource. The SMF device transmits the first port configuration parameter to the second UE. A process in which the SMF device transmits the first port configuration parameter to the second UE may include the following operations (1) to (3):

(1) The SMF device transmits a communication message transfer (Namf_Communication_N1N2MessageTransfer (N1 SM container)) to an AMF device, the Namf_Communication_N1N2MessageTransfer (N1 SM container) including a port management information container, the port management information container carrying the first port configuration parameter.

(2) The AMF device forwards the Namf_Communication_N1N2MessageTransfer (N1 SM container) to an NG RAN.

(3) The NG RAN transmits an access network specific resource modification (AN-specific resource modification (N1 SM container)) to the second UE, the AN-specific resource modification (N1 SM container) including a port management information container, the port management information container carrying the first port configuration parameter.

A cause of initiating the first UE logout process may include the first UE being powered off, or the first UE being unreachable to a 5G network. The SMF device records a port management parameter of the first UE and a port management parameter of the second UE. In addition, the port management parameter further includes a UE ID, a first port management parameter, and a second port management parameter. The first port management parameter includes a first port list provided by a DS-TT connected to the first UE and a residence time between the first UE and each first port under the DS-TT; and the second port management parameter includes a second port list provided by an NW-TT connected to a UPF device. The SMF device further records a first QoS flow of the first UE and a second QoS flow of the second UE. When both the first QoS flow and the second QoS flow are periodic QoS flows and have the same period, the first QoS flow and the second QoS flow share the same first port but respectively occupy different time slots in the same first port; or the first QoS flow and the second QoS flow share the same second port but respectively occupy different time slots in the same second port; or the first QoS flow and the second QoS flow share the same port pair but respectively occupy different time slots in the same port pair. One port pair includes one first port in the first port list and one second port in the second port list. When both the first QoS flow and the second QoS flow are aperiodic QoS flows, the first QoS flow and the second QoS flow share transmission resources of the same first port, or the first QoS flow and the second QoS flow share transmission resources of the same second port, or the first QoS flow and the second QoS flow share transmission resources of the same port pair.

In operation S803, the SMF device transmits the first port configuration parameter to the second UE, and the second UE makes an indication to a corresponding DS-TT according to a first port in the port resource in the first port configuration parameter. When an IP connection exists between the second UE and the DS-TT, an indication manner of the second UE to the DS-TT may include at least one of performing an indication by using an IP tunnel specified in the IP connection, performing an indication by using an identifier of the first port in the port resource, and performing an indication by using an IP address corresponding to the IP connection. One IP connection includes a plurality of IP tunnels, and one IP tunnel corresponds to one port number. The specified IP tunnel herein may refer to an IP tunnel corresponding to a port number of the first port in the port resource. When a non-IP connection exists between the second UE and the DS-TT, the indication manner of the second UE to the DS-TT may include performing an indication by using an identifier of a special L2 (a data link layer) or an identifier of a special L1 (a physical layer). The identifier of the special L2 herein may refer to another identifier different from an identifier of a conventional L2, and the identifier of the special L1 may refer to another identifier different from an identifier of a conventional L1.

In this embodiment of the disclosure, in a first UE logout process due to power off or unreachability, all PDU sessions of the first UE are released. In this case, an SMF device may reports a port management parameter of the first UE to a CNC, the port management parameter including port resources associated with all the PDU sessions of the first UE, that is, port pairs used by TSC SDFs included in all the PDU sessions of the first UE. The CNC recovers the port pairs used for transmitting all the TSC SDFs in all the PDU sessions of the first UE, and the recovered port pairs may be allocated to TSC SDFs of other UEs subsequently. The CNC updates a port configuration parameter of the first UE. Normally, the CNC transmits the updated port configuration parameter to the SMF device, and then the SMF device forwards the updated port configuration parameter to the first UE, such that the first UE indicates that the port resource has been recovered to a DS-TT connected to the first UE. However, because the first UE is powered off or is not reachable to a 5G network, the SMF device cannot transmit the updated port configuration parameter to the first UE. As a result, the DS-TT connected to the first UE cannot learn a change in the first port in the port resource. A solution provided by this embodiment of the disclosure is that: another second UE sharing the same first port on the same DS-TT with the first UE updates a port configuration parameter of the shared same first port on the same DS-TT. The SMF device may transmits the port configuration parameter to the second UE, and the second UE makes an indication to a DS-TT connected to the second UE (i.e., the DS-TT commonly connected to the first UE and the second UE).

In this embodiment of the disclosure, one UE is supported to connect a plurality of DS-TTs, and one DS-TT supports a plurality of ports. One UPF device is supported to connect a plurality of NW-TTs, and one NW-TT supports a plurality of ports. A plurality of TSC services of different periods and TSC services of a plurality of UEs are supported. The problem of port management under the TSC services of different periods of different UEs is resolved. In addition, in a first UE logout process due to power off or UE unreachability, a problem that a DS-TT connected to the first UE cannot learn a change in a first port in a port resource because the SMF device cannot transmits an updated port configuration parameter to the first UE due to power off of the first UE or unreachability to a 5G network is resolved. In this embodiment of the disclosure, another second UE sharing the same first port on the same DS-TT with the first UE updates a port configuration parameter of the same first port on the shared DS-TT, and the second UE makes an indication to a DS-TT connected to the second UE (i.e., the DS-TT commonly connected to the first UE and the second UE), such that the DS-TT connected to the first UE may learn the change in the first port in the port resource in time, thereby achieving the effective management of the port, avoiding the problems of poor configuration, a transmission conflict, and the like, and ensuring smooth data transmission of a TSN.

Figure 9:
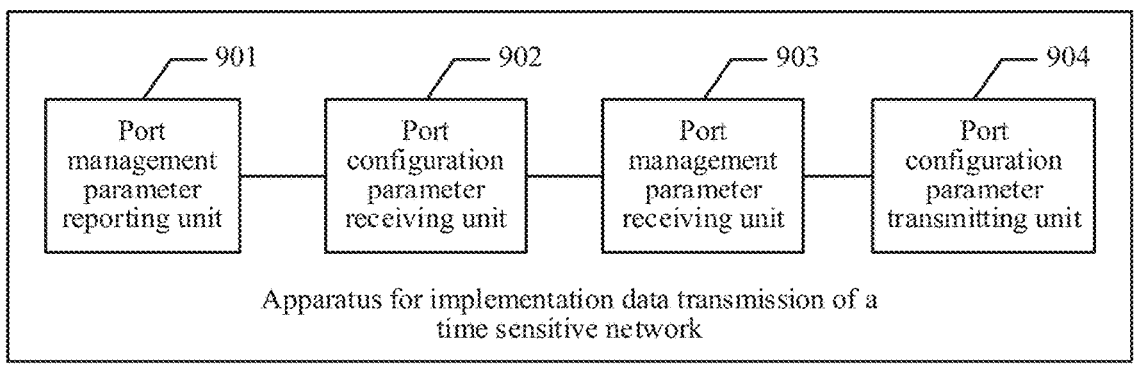
FIG. 9 is a diagram of a structure of an apparatus for implementing data transmission of a TSN according to an embodiment.

FIG. 9 is a diagram of a structure of an apparatus for implementing data transmission of a TSN according to an embodiment. In an embodiment, the apparatus may be a computer program (including program code) running in an SMF device. The apparatus may be configured to perform the method shown in FIG. 5. Referring to FIG. 9, the apparatus includes the following units 901 and 902.

A port management parameter reporting unit 901 may be configured to report a port management parameter to a CNC in a PDU session management process of a UE, the port management parameter including a UE ID, a first port list provided by a DS-TT connected to the UE, and a second port list provided by an NW-TT connected to a UPF device.

A port configuration parameter receiving unit 902 may be configured to receive a port configuration parameter delivered by the CNC, the port configuration parameter including a port resource associated with the PDU session.

In an embodiment, the port resource includes a plurality of port pairs, one port pair including one first port in the first port list and one second port in the second port list.

The port management parameter includes the UE ID, a first port management parameter, and a second port management parameter, the first port management parameter including the first port list provided by the DS-TT connected to the UE, and the second port management parameter including the second port list provided by the NW-TT connected to the UPF device.

The port configuration parameter includes a first port configuration parameter and a second port configuration parameter, the first port configuration parameter including a first port in the port resource, and the second port configuration parameter including a second port in the port resource.

In another embodiment, the PDU session includes an aperiodic TSC SDF; the port management parameter further includes a flag of the aperiodic TSC SDF; and the port resource includes a port pair used for transmitting the aperiodic TSC SDF.

In another embodiment, when the PDU session includes a plurality of aperiodic TSC SDFs, the plurality of aperiodic TSC SDFs share transmission resources in the same port pair.

In another embodiment, the PDU session includes a periodic TSC SDF; the periodic TSC SDF is mapped to a QoS flow; and the port resource further includes a port pair used for transmitting the QoS flow.

In another embodiment, when the PDU session includes a plurality of periodic TSC SDFs and the plurality of periodic TSC SDFs have the same period and the same QoS requirement, the plurality of periodic TSC SDFs are mapped to the same QoS flow.

In another embodiment, when the PDU session includes a plurality of QoS flows and the plurality of QoS flows have the same period, the plurality of QoS flows share the same port pair but respectively occupy different time slots in the same port pair.

The port resource further includes the shared same port pair and the different time slots that are respectively occupied in the shared same port pair and are used for transmitting the periodic TSC SDFs in the QoS flow.

In still another embodiment, the PDU session management process of the UE may include a PDU session establishment process of the UE. The first port management parameter further includes a residence time between the LTE and each first port under the DS-TT; and the port configuration parameter is used for indicating that the CNC has allocated the port resource for the PDU session according to the port management parameter.

In still another embodiment, the apparatus further includes a port management parameter receiving unit 903, configured to receive a first port management parameter transmitted by the UE by using an AMF device and receive a second port management parameter transmitted by the UPF device in a PDU session establishment process of the UE.

In still another embodiment, the PDU session management process of the UE may include a PDU session release process of the UE. The port management parameter further includes a port resource associated with the PDU session; and the port configuration parameter is used for indicating that the CNC has recovered the port resource.

In still another embodiment, the apparatus further includes a port configuration parameter transmitting unit 904, configured to transmit the first port configuration parameter to the UE, such that the UE indicates a first port in the port resource to the DS-TT connected to the UE.

In still another embodiment, when an IP connection exists between the second UE and the DS-TT, an indication manner of the second UE to the DS-TT may include at least one of performing an indication by using an IP tunnel specified in the IP connection, performing an indication by using an identifier of the first port in the port resource, and performing an indication by using an IP address corresponding to the IP connection. When a non-IP connection exists between the UE and the DS-TT, the indication manner of the UE device to the DS-TT may include performing an indication by using an identifier of a special L2 or an identifier of a special L1.

In still another embodiment, the port configuration parameter transmitting unit 904 is further configured to transmit the second port configuration parameter to the UPF device, such that the UPF device indicates a second port in the port resource to the NW-TT connected to the UPF device.

In still another embodiment, when an IP connection exists between the UPF device and the NW-TT, an indication manner of the UPF device to the NW-TT includes at least one of performing an indication by using an IP tunnel specified in the IP connection, performing an indication by using an identifier of the second port in the port resource, and performing an indication by using an IP address corresponding to the IP connection. When a non-IP connection exists between the UPF device and the NW-TT, the indication manner of the UPF device to the NW-TT may include performing an indication by using an identifier of a special L2 or an identifier of a special L1.

In another embodiment, if the PDU session is an HR PDU session, the apparatus may be a computer program (including a program code) running in an H-SMF device, and the apparatus may be configured to perform the method shown in FIG. 6.

In an embodiment, the port management parameter receiving unit 903 is further configured to receive a first port management parameter transmitted by a V-SMF device in an HR PDU session establishment process of the UE, the first port management parameter being transmitted by the UE to the V-SMF device by using an AMF device.

In another embodiment, the port configuration parameter transmitting unit 904 is further configured to transmit a first port configuration parameter to the V-SMF device, and the V-SMF device forwards the first port configuration parameter to the UE, such that the UE indicates that a first port in the port resource to the DS-TT connected to the UE.

In this embodiment of the disclosure, in a PDU session (or an HR PDU session) management process of a UE, an SMF device (or an H-SMF device) reports a port management parameter to a CNC, the port management parameter including a UE ID, a first port list provided by a DS-TT connected to the UE, and a second port list provided by an NW-TT connected to a UPF device. The reporting process herein may enable the CNC to timely and comprehensively master all port conditions in the PDU session (or the HR PDU session) management process of the UE, so as to effectively and comprehensively manage the ports. For example, port resources are allocated for an aperiodic service and/or a periodic service included in the PDU session (or the HR PDU session) of the UE, or allocated port resources are managed. In this way, a transmission conflict between aperiodic service data and periodic service data may be effectively resolved, and the ports may be well configured. In addition, the CNC delivers a port configuration parameter to the SMF device (or the H-SMF device), such that the SMF device (or the H-SMF device) may learn configuration content of the port resource in time, which is beneficial to notifying the ports in the port resource to have good transmission preparation, thereby achieving data transmission of a TSN.

Figure 10:
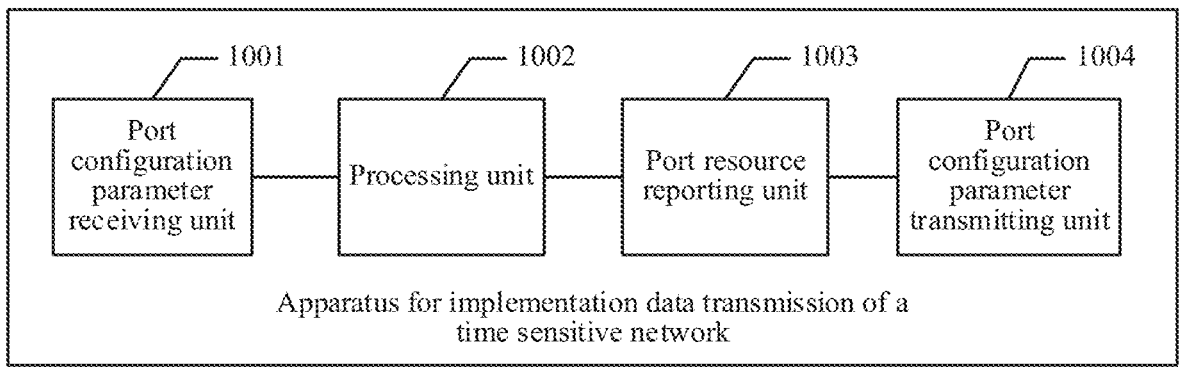
FIG. 10 is a diagram of a structure of an apparatus for implementing data transmission of a TSN according to an embodiment.

FIG. 10 is a diagram of a structure of another apparatus for implementing data transmission of a TSN according to an embodiment. The apparatus may be a computer program (including program code) running in an SMF device. The apparatus may be configured to perform the method shown in FIG. 7. Referring to FIG. 10, the apparatus includes the following units 1001 and 1002.

A port configuration parameter receiving unit 1001 may be configured to receive a port configuration parameter delivered by a CNC, the port configuration parameter including a port resource allocated by the CNC for a target TSC SDF in a PDU session of a UE.

A processing unit 1002 may be configured to allocate a newly created target QoS flow for the UE according to the port configuration parameter, map the target TSC SDF to the target QoS flow, and associate the target QoS flow with the port resource.

In an embodiment, the SMF device records a port management parameter of the UE, and the CNC also records the port management parameter of the UE.

The port management parameter includes the UE ID, a first port management parameter, and a second port management parameter. The first port management parameter includes a first port list provided by a DS-TT connected to the UE and a residence time between the UE and each first port under the DS-TT; and the second port management parameter includes a second port list provided by an NW-TT connected to a UPF device.

The port configuration parameter includes a first port configuration parameter and a second port configuration parameter, the first port configuration parameter including a first port in the port resource. The second port configuration parameter includes a second port in the port resource.

In another embodiment, when the target TSC SDF is periodic service data, the port resource includes a target port pair and time slots that are occupied in the target port pair and are used for transmitting the target TSC SDF. When the target TSC SDF is aperiodic service data, the port resource includes a target port pair and transmission resources that are occupied in the target port pair and are used for transmitting the target TSC SDF.

The target port pair includes one first port in the first port list and one second port in the second port list.

In another embodiment, the SMF device further records a port pair associated with an existing QoS flow of the UE. One port pair includes one first port in the first port list and one second port in the second port list.

In still another embodiment, one existing QoS flow is associated with one port pair. When the existing QoS flow is a periodic QoS flow, two or more existing QoS flows having the same period share the same port pair and respectively occupy different time slots in the same port pair. When the existing QoS flow is an aperiodic QoS flow, two or more existing QoS flows share the same port pair and respectively occupy different transmission resources in the same port pair.

In still another embodiment, the processing unit 1002 is further configured to determine whether the target port pair is the port pair that is recorded by the SMF device and is associated with the existing QoS flow; if the target port pair is not the port pair that is recorded by the SMF device and is associated with the existing QoS flow, newly create a target QoS flow for the UE, map the target TSC SDF to the target QoS flow, and associate the target QoS flow with the port resource; and if the target port pair is the port pair that is recorded by the SMF device and is associated with the existing QoS flow, map the target TSC SDF to the existing QoS flow, and update information about the existing QoS flow.

In still another embodiment, the apparatus further includes: a port resource reporting unit 1003, configured to report the port resource to the CNC when the target QoS flow is deleted.

The port configuration parameter receiving unit 1001 may be configured to receive an updated port configuration parameter delivered by the CNC, the updated port configuration parameter being used for indicating that the CNC has recovered the port resource.

In still another embodiment, the port resource reporting unit 1003 is further configured to report a flag of the target TSC SDF and the port resource to the CNC when the target TSC SDF is deleted and the target QoS flow further includes other TSC SDFs.

The port configuration parameter receiving unit 1001 is further configured to receive an updated port configuration parameter delivered by the CNC, the updated port configuration parameter being used for indicating that the CNC has recovered time slots or transmission resources in the target port pair that are used for transmitting the target TSC SDF.

In still another embodiment, the apparatus further includes: a port configuration parameter transmitting unit 1004, configured to transmit the first port configuration parameter to the UE, such that the UE indicates a first port in the port resource to the DS-TT connected to the UE.

In still another embodiment, when an IP connection exists between the second UE and the DS-TT, an indication manner of the second UE to the DS-TT may include at least one of performing an indication by using an IP tunnel specified in the IP connection, performing an indication by using an identifier of the first port in the port resource, and performing an indication by using an IP address corresponding to the IP connection. When a non-IP connection exists between the UE and the DS-TT, the indication manner of the UE device to the DS-TT may include performing an indication by using an identifier of a special L2 or an identifier of a special L1.

In still another embodiment, the port configuration parameter transmitting unit 1004 is further configured to transmit the second port configuration parameter to the UPF device, such that the UPF device indicates a second port in the port resource to the NW-TT connected to the UPF device.

In still another embodiment, when an IP connection exists between the UPF device and the NW-TT, an indication manner of the UPF device to the NW-TT includes at least one of performing an indication by using an IP tunnel specified in the IP connection, performing an indication by using an identifier of the second port in the port resource, and performing an indication by using an IP address corresponding to the IP connection. When a non-IP connection exists between the UPF device and the NW-TT, the indication manner of the UPF device to the NW-TT may include performing an indication by using an identifier of a special L2 or an identifier of a special L1.

In this embodiment of the disclosure, when processes of newly adding a TSC newly creating a target QoS flow, deleting the target QoS flow, deleting a target TSC SDF, and the like occur on a PDU session of a UE, a CNC updates a configuration of a port resource of the PDU session of the UE, including allocating a time slot or a transmission resource of a port, recovering a port pair, recovering the time slot or the transmission resource of the port, and the like, updates a port configuration parameter, and delivers the updated port configuration parameter to an SMF device. In this way, the SMF device may learn configuration content of the port resource in time, which is beneficial to notifying a corresponding port in the port resource, thereby achieving the effective management of the port, avoiding the problems of poor configuration, a transmission conflict, and the like, and ensuring smooth data transmission of a TSN.

Figure 11:
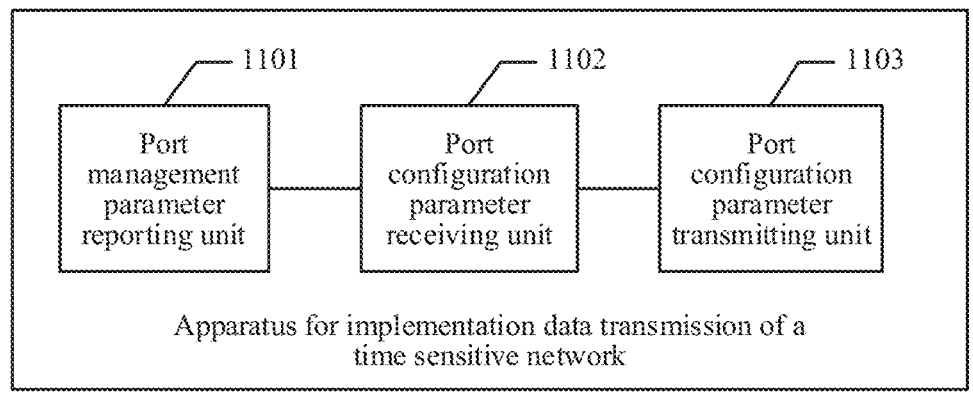
FIG. 11 is a diagram of a structure of an apparatus for implementing data transmission of a TSN according to an embodiment.

FIG. 11 is a diagram of a structure of another apparatus for implementing data transmission of a TSN according to an embodiment. The apparatus may be a computer program (including program code) running in an SMF device. The apparatus may be configured to perform the method shown in FIG. 8. Referring to FIG. 11, the apparatus includes the following units 1101 and 1103.

A port management parameter reporting unit 1101 may be configured to report, in a first UE logout process, a port management parameter to a CNC when a PDU session of the first UE is released, the port management parameter including a port resource allocated by the CNC for the PDU session.

A port configuration parameter receiving unit 1102 may be configured to receive a port configuration parameter delivered by the CNC, the port configuration parameter being used for indicating that the CNC has recovered the port resource.

A port configuration parameter transmitting unit 1103 may be configured to transmit the port configuration parameter to a second UE, such that the second UE indicates that the port resource has been recovered to a DS-TT connected to the second UE, the first UE and the second UE sharing the same first port provided by the same DS-TT.

A cause of initiating the first UE logout process may include the first UE being powered off, or the first UE being unreachable to a 5G network.

In an embodiment, the SMF device records a port management parameter of the first UE and a port management parameter of the second UE.

The port management parameter includes a UE ID, a first port management parameter, and a second port management parameter. The first port management parameter includes a first port list provided by a DS-TT connected to the UE and a residence time between the UE and each first port under the DS-TT; and the second port management parameter includes a second port list provided by an NW-TT connected to a UPF device.

The port configuration parameter includes a first port configuration parameter and a second port configuration parameter, the first port configuration parameter including a first port in the port resource, and the second port configuration parameter including a second port in the port resource.

In another embodiment, the SMF device further records a first QoS flow of the first UE and a second QoS flow of the second UE.

When both the first QoS flow and the second QoS flow are periodic QoS flows and have the same period, the first QoS flow and the second QoS flow share the same first port but respectively occupy different time slots in the same first port; or the first QoS flow and the second QoS flow share the same second port but respectively occupy different time slots in the same second port; or the first QoS flow and the second QoS flow share the same port pair but respectively occupy different time slots in the same port pair.

One port pair includes one first port in the first port list and one second port in the second port list.

In still another embodiment, when both the first QoS flow and the second QoS flow are aperiodic QoS flows, the first QoS flow and the second QoS flow share transmission resources of the same first port, or the first QoS flow and the second QoS flow share transmission resources of the same second port, or the first QoS flow and the second QoS flow share transmission resources of the same port pair.

In still another embodiment, the port configuration parameter transmitting unit 1103 is further configured to transmit the first port configuration parameter to the second UE.

In still another embodiment, when an IP connection exists between the second UE and the DS-TT, an indication manner of the second UE to the DS-TT may include at least one of performing an indication by using an IP tunnel specified in the IP connection, performing an indication by using an identifier of the first port in the port resource, and performing an indication by using an IP address corresponding to the IP connection. When a non-IP connection exists between the second UE and the DS-TT, the indication manner of the second UE device to the DS-TT may include performing an indication by using an identifier of a special L2 or an identifier of a special L1.

In this embodiment of the disclosure, one UE is supported to connect a plurality of DS-TTs, and one DS-TT supports a plurality of ports. One UPF device is supported to connect a plurality of NW-TTs, and one NW-TT supports a plurality of ports. A plurality of TSC services of different periods and TSC services of a plurality of UEs are supported. The problem of port management under the TSC services of different periods of different UEs is resolved. In addition, in a first UE logout process due to power off or UE unreachability, a problem that a DS-TT connected to the first UE cannot learn a change in a first port in a port resource because the SMF device cannot transmits an updated port configuration parameter to a first UE due to power off of the first UE or unreachability to a 5G network is resolved. In this embodiment of the disclosure, another second UE sharing the same first port on the same DS-TT with the first UE updates a port configuration parameter of the same first port on the shared DS-TT, and the second UE makes an indication to a DS-TT (i.e., the DS-TT commonly connected to the first UE and the second UE) connected to the second UE, such that the DS-TT connected to the first UE may learn the change in the first port in the port resource in time, thereby implementing the effective management of the port, avoiding the problems of poor configuration, a transmission conflict, and the like, and ensuring smooth data transmission of a TSN.

Figure 12:
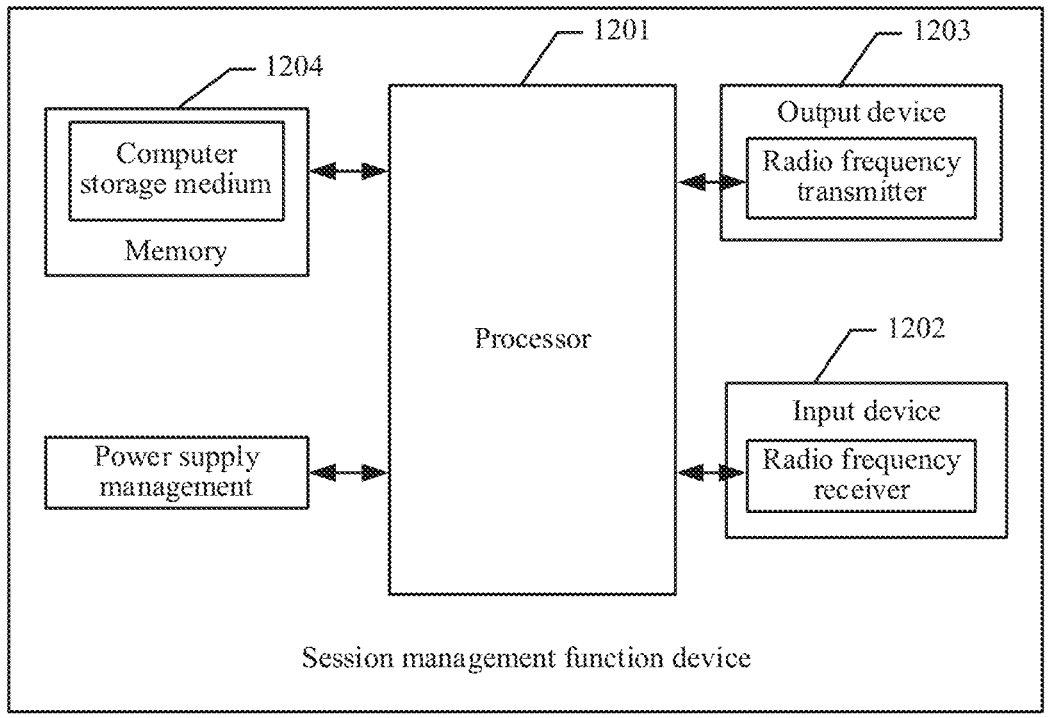
FIG. 12 is a diagram of a session management function (SMF) device according to an embodiment.

FIG. 12 is a schematic structural diagram of an SMF device according to an exemplary embodiment of the disclosure. Referring to FIG. 12, the SMF device includes at least a processor 1201, an input device 1202, an output device 1203, and a computer storage medium 1204. The processor 1201, the input device 1202, the output device 1203, and the computer storage medium 1204 may be connected by a bus or in another manner. The computer storage medium 1204 may be located in a memory of the SMF device and may be configured to store a computer program. The computer program includes program instructions. The processor 1201 may be configured to execute the program instructions stored in the computer storage medium 1204, to perform the method for implementing data transmission of a TSN according to the foregoing embodiments. The processor 1201 (or referred to as a central processing unit (CPU)) is a computing core and a control core of the SMF device, is suitable for implementing one or more instructions, and is suitable for loading and executing the one or more instructions to implement a corresponding method procedure or a corresponding function.

The embodiments of the disclosure further provide a computer program product or a computer program. The computer program product or the computer program includes computer instructions, the computer instructions being stored in a computer-readable storage medium. A processor of a computer device reads the computer instructions from the computer-readable storage medium, and executes the computer instructions, such that the computer device performs the method for implementing data transmission of a TSN according to the foregoing embodiments.

The embodiments of the disclosure further provide a computer storage medium (memory) 1204, and the computer storage medium is a memory device of the SMF device and may be configured to store programs and data. The computer storage medium provides a storage space, the storage space further stores one or more instructions suitable for being loaded and executed by the processor 1201. The instructions may be one or more computer programs (including program code). The computer storage medium herein may be a high speed RAM or a non-volatile memory, for example, at least one magnetic disk memory. Optionally, the computer storage medium may be further at least one computer storage medium located away from the foregoing processor.

In an embodiment, the processor 1201 loads and executes one or more instructions stored in the computer storage medium, to implement the method in the embodiments shown in FIG. 5 to FIG. 8. In an embodiment, the one or more instructions in the computer storage medium are loaded and executed by the processor 1201 to further perform the following steps: reporting a port management parameter to a CNC in a PDU session management process of a UE, the port management parameter including a UE ID, a first port list provided by a DS-TT connected to the UE, and a second port list provided by an NW-TT connected to a UPF device, and receiving a port configuration parameter delivered by the CNC, the port configuration parameter including a port resource associated with the PDU session.

In an embodiment, the port resource includes plurality of port pairs. One port pair includes one first port in the first port list and one second port in the second port list.

The port management parameter includes a UE ID, a first port management parameter, and a second port management parameter, the first port management parameter including the first port list provided by the DS-TT connected to the UE, and the second port management parameter including the second port list provided by the NW-TT connected to the UPF device.

The port configuration parameter includes a first port configuration parameter and a second port configuration parameter, the first port configuration parameter including a first port in the port resource, and the second port configuration parameter including a second port in the port resource.

In another embodiment, the PDU session includes an aperiodic TSC SDF; the port management parameter further includes a flag of the aperiodic TSC SDF; and the port resource includes a port pair used for transmitting the aperiodic TSC SDF.

In another embodiment, when the PDU session includes a plurality of aperiodic TSC SDFs, the plurality of aperiodic TSC SDFs share transmission resources in the same port pair.

In another embodiment, the PDU session includes a periodic TSC SDF; the periodic TSC SDF is mapped to a QoS flow; and the port resource further includes a port pair used for transmitting the QoS flow.

In another embodiment, when the PDU session includes a plurality of periodic TSC SDFs and the plurality of periodic TSC SDFs have the same period and the same QoS requirement, the plurality of periodic TSC SDFs are mapped to the same QoS flow.

In another embodiment, when the PDU session includes a plurality of QoS flows and the plurality of QoS flows have the same period, the plurality of QoS flows share the same port pair but respectively occupy different time slots in the same port pair.

The port resource further includes the shared same port pair and the different time slots that are respectively occupied in the shared same port pair and are used for transmitting the periodic TSC SDFs in the QoS flow.

In still another embodiment, the PDU session management process of the UE may include a PDU session establishment process of the UE. The first port management parameter further includes a residence time between the UE and each first port under the DS-TT; and the port configuration parameter is used for indicating that the CNC has allocated the port resource for the PDU session according to the port management parameter.

In an embodiment, the one or more instructions in the computer storage medium are loaded and executed by the processor 1201 to further perform the following step: receiving a first port management parameter transmitted by the UE by using an AMF device and receiving a second port management parameter transmitted by the UPF device in a PDU session establishment process of the UE.

In still another embodiment, the PDU session management process of the UE may include a PDU session release process of the UE. The port management parameter further includes a port resource associated with the PDU session; and the port configuration parameter is used for indicating that the CNC has recovered the port resource.

In still another embodiment, the one or more instructions in the computer storage medium are loaded and executed by the processor 1201 to further perform following step: transmitting a first port configuration parameter to the UE, such that the UE indicates a first port in the port resource to the DS-TT connected to the UE.

In still another embodiment, when an IP connection exists between the second UE and the DS-TT, an indication manner of the second UE to the DS-TT may include at least one of performing an indication by using an IP tunnel specified in the IP connection, performing an indication by using an identifier of the first port in the port resource, and performing an indication by using an IP address corresponding to the IP connection. When a non-IP connection exists between the second UE and the DS-TT, the indication manner of the second UE device to the DS-TT may include performing an indication by using an identifier of a special L2 or an identifier of a special L1.

In still another embodiment, the one or more instructions in the computer storage medium are loaded and executed by the processor 1201 to further perform following step: transmitting a second port configuration parameter to the UPF device, such that the UPF device indicates a second port in the port resource to the NW-TT connected to the UPF device.

In still another embodiment, when an IP connection exists between the UPF device and the NW-TT, an indication manner of the UPF device to the NW-TT includes at least one of performing an indication by using an IP tunnel specified in the IP connection, performing an indication by using an identifier of the second port in the port resource, and performing an indication by using an IP address corresponding to the IP connection. When a non-IP connection exists between the UPF device and the NW-TT, the indication manner of the UPF device to the NW-TT may include performing an indication by using an identifier of a special L2 or an identifier of a special L1.

In still another embodiment, when the PDU session is an HR PDU session, the SMF device is an H-SMF device.

In still another embodiment, the one or more instructions in the computer storage medium are loaded and executed by the processor 1201 to further perform following step: receiving a first port management parameter transmitted by a V-SMF device in an HR PDU session establishment process of the UE, the first port management parameter being transmitted by the UE to the V-SMF device by using an AMF device.

In another embodiment, the one or more instructions in the computer storage medium are loaded and executed by the processor 1201 to further perform following step: transmitting a first port configuration parameter to the V-SMF device, and forwarding, by the V-SMF device, the first port configuration parameter to the UE, such that the UE indicates a first port in the port resource to the DS-TT connected to the UE.

In another embodiment, the one or more instructions in the computer storage medium are loaded and executed by the processor 1201 to further perform the following steps: receiving a port configuration parameter delivered by a CNC, the port configuration parameter including a port resource allocated by the CNC for a target TSC SDF in a PDU session of a UE, and allocating a newly created target QoS flow for the UE according to the port configuration parameter, mapping the target TSC SDF to the target QoS flow, and associating the target QoS flow with the port resource.

In an embodiment, the SMF device records a port management parameter of the UE; and the CNC records the port management parameter of the UE.

The port management parameter includes a UE ID, a first port management parameter, and a second port management parameter, the first port management parameter including the first port list provided by the DS-TT connected to the UE and a residence time between the UE and each first port under the DS-TT, and the second port management parameter including the second port list provided by the NW-TT connected to the UPF device.

The port configuration parameter includes a first port configuration parameter and a second port configuration parameter, the first port configuration parameter including a first port in the port resource, and the second port configuration parameter including a second port in the port resource.

In another embodiment, when the target TSC SDF is periodic service data, the port resource includes a target port pair and time slots that are occupied in the target port pair and are used for transmitting the target TSC SDF. When the target TSC SDF is aperiodic service data, the port resource includes a target port pair and transmission resources that are occupied in the target port pair and are used for transmitting the target TSC SDF.

The target port pair includes one first port in the first port list and one second port in the second port list.

In another embodiment, the SMF device further records a port pair associated with an existing QoS flow of the UE, one port pair including one first port in the first port list and one second port in the second port list.

In still another embodiment, the existing QoS flow is associated with the port pair, when the existing QoS flow is a periodic QoS flow, two or more existing QoS flows having the same period share the same port pair and respectively occupy different time slots in the same port pair, and when the existing QoS flow is an aperiodic QoS flow, two or more existing QoS flows share the same port pair and respectively occupy different transmission resources in the same port pair.

In still another embodiment, the one or more instructions in the computer storage medium are loaded and executed by the processor 1201 to further perform the following steps: determining whether the target port pair is the port pair that is recorded by the SMF device and is associated with the existing QoS flow; if the target port pair is not the port pair that is recorded by the SMF device and is associated with the existing QoS flow, newly creating a target QoS flow for the UE, mapping the target TSC SDF to the target QoS flow, and associating the target QoS flow with the port resource; and if the target port pair is the port pair that is recorded by the SMF device and is associated with the existing QoS flow, mapping the target TSC SDF to the existing QoS flow, and updating information about the existing QoS flow.

In still another embodiment, the one or more instructions in the computer storage medium are loaded and executed by the processor 1201 to further perform following step: when the target QoS flow is deleted, reporting the port resource to the CNC; and receiving an updated port configuration parameter delivered by the CNC, the updated port configuration parameter being used for indicating that the CNC has recovered the port resource.

In still another embodiment, the one or more instructions in the computer storage medium are loaded and executed by the processor 1201 to further perform the following steps: reporting a flag of the target TSC SDF and the port resource to the CNC when the target TSC SDF is deleted and the target QoS flow further includes other TSC SDFs, and receiving an updated port configuration parameter delivered by the CNC, the updated port configuration parameter being used for indicating that the CNC has recovered time slots or transmission resources in the target port pair that are used for transmitting the target TSC SDF.

In still another embodiment, the one or more instructions in the computer storage medium are loaded and executed by the processor 1201 to further perform following step: transmitting the first port configuration parameter to the UE, such that the UE indicates a first port in the port resource to the DS-TT connected to the UE.

In still another embodiment, when an IP connection exists between the second UE and the DS-TT, an indication manner of the second UE to the DS-TT may include at least one of performing an indication by using an IP tunnel specified in the IP connection, performing an indication by using an identifier of the first port in the port resource, and performing an indication by using an IP address corresponding to the IP connection. When a non-IP connection exists between the second UE and the DS-TT, the indication manner of the second UE device to the DS-TT may include performing an indication by using an identifier of a special L2 or an identifier of a special L1.

In still another embodiment, the one or more instructions in the computer storage medium are loaded and executed by the processor 1201 to further perform following step: transmitting the second port configuration parameter to the UPF device, such that the UPF device indicates a second port in the port resource to the NW-TT connected to the UPF device.

In still another embodiment, when an IP connection exists between the UPF device and the NW-TT, an indication manner of the UPF device to the NW-TT includes at least one of performing an indication by using an IP tunnel specified in the IP connection, performing an indication by using an identifier of the second port in the port resource, and performing an indication by using an IP address corresponding to the IP connection. When a non-IP connection exists between the UPF device and the NW-TT, the indication manner of the UPF device to the NW-TT may include performing an indication by using an identifier of a special L2 or an identifier of a special L1.

In still another embodiment, the one or more instructions in the computer storage medium are loaded and executed by the processor 1201 to further perform the following steps: reporting, in a first UE logout process, a port management parameter to a CNC when a PDU session of the first UE is released, the port management parameter including a port resource allocated by the CNC for the PDU session; receiving a port configuration parameter delivered by the CNC, the port configuration parameter being used for indicating that the CNC has recovered the port resource; and transmitting the port configuration parameter to a second UE, such that the second UE indicates that the port resource has been recovered to a DS-TT connected to the second UE, the first UE and the second UE sharing the same first port provided by the same DS-TT.

A cause of initiating the first UE logout process may include the first UE being powered off, or the first UE being unreachable to a 5G network.

In an embodiment, the SMF device records a port management parameter of the first UE and a port management parameter of the second UE.

The port management parameter includes a UE ID, a first port management parameter, and a second port management parameter, the first port management parameter including a first port list provided by a DS-TT connected to the UE and a residence time between the UE and each first port under the DS-TT, and the second port management parameter including a second port list provided by an NW-TT connected to a UPF device.

The port configuration parameter includes a first port configuration parameter and a second port configuration parameter, the first port configuration parameter including a first port in the port resource, and the second port configuration parameter including a second port in the port resource.

In another embodiment, the SMF device further records a first QoS flow of the first UE and a second QoS flow of the second UE.

When both the first QoS flow and the second QoS flow are periodic QoS flows and have the same period, the first QoS flow and the second QoS flow share the same first port but respectively occupy different time slots in the same first port; or the first QoS flow and the second QoS flow share the same second port but respectively occupy different time slots in the same second port; or the first QoS flow and the second QoS flow share the same port pair but respectively occupy different time slots in the same port pair.

One port pair includes one first port in the first port list and one second port in the second port list.

When both the first QoS flow and the second QoS flow are aperiodic QoS flows, the first QoS flow and the second QoS flow share transmission resources of the same first port, or the first QoS flow and the second QoS flow share transmission resources of the same second port, or the first QoS flow and the second QoS flow share transmission resources of the same port pair.

In still another embodiment, the one or more instructions in the computer storage medium are loaded and executed by the processor 1201 to perform following step: transmitting the first port configuration parameter to the second UE.

In still another embodiment, when an IP connection exists between the second UE and the DS-TG, an indication manner of the second UE to the DS-TT may include at least one of performing an indication by using an IP tunnel specified in the IP connection, performing an indication by using an identifier of the first port in the port resource, and performing an indication by using an IP address corresponding to the IP connection. When a non-IP connection exists between the second UE and the DS-TT, the indication manner of the second UE device to the DS-TT may include performing an indication by using an identifier of a special L2 or an identifier of a special L1.

In this embodiment of the disclosure, in a PDU session management process of a UE, an SMF device reports a port management parameter to a CNC, the port management parameter including a UE ID, a first port list provided by a DS-TT connected to the UE, and a second port list provided by an NW-TT connected to a UPF device. The reporting process herein may enable the CNC to timely and comprehensively master all port conditions in the PDU session management process of the UE, so as to effectively and comprehensively manage the ports. For example, port resources are allocated for an aperiodic service and/or a periodic service included in the PDU session of the UE, or allocated port resources are managed. In this way, a transmission conflict between aperiodic service data and periodic service data may be effectively resolved, and the ports may be well configured. In addition, the CNC delivers a port configuration parameter to the SMF device, such that the SMF device may learn configuration content of the port resource in time, which is beneficial to notifying the ports in the port resource to have good transmission preparation, thereby achieving data transmission of a TSN.

The foregoing disclosure is merely embodiments of the disclosure, and certainly is not intended to limit the protection scope of the disclosure. Therefore, equivalent variations made in accordance with the claims of the disclosure shall fall within the scope of the disclosure.

What is claimed is:

1. A method for implementing data transmission of a time-sensitive network (TSN), the method comprising:
reporting, by a session management function (SMF) device, a port number list of a device-side TSN converter to an application function device and a port number list of a network TSN converter; and
receiving, by the SMF device, a port configuration parameter issued by the application function device, the port configuration parameter comprising port resources associated with a protocol data unit (PDU) session;
wherein the PDU comprises a plurality of periodic time sensitive communication service data flows;
wherein the plurality of periodic time-sensitive communication service data flows have the same quality of service requirement; and
wherein the plurality of periodic time-sensitive communication service data flows have the same period and the same period of service quality, the same period being a period of the plurality of periodic time-sensitive communication service data flows being the same, or the period of the plurality of periodic time-sensitive communication service data flows having a greatest common divisor.

2. The method of claim 1, wherein the reporting, by the SMF device, the port number list comprises, after the PDU session is established, reporting, by the SMF device the port number list of the network TSN converter to the application function device.

3. The method of claim 1, wherein the port number list of the network TSN converter comprises a port number corresponding to a port of one or more network TSN converters.

4. The method of claim 1, wherein the reporting, by the SMF device, the port number list of the device-side TSN converter to the application function device comprises, during a session establishment process or a PDU session modification process of the PDU, reporting, by the SMF device, the port number list of the device-side TSN converter to the application function device.

5. The method of claim 1, wherein the port number list of the device-side TSN converter comprises a port number corresponding to a port of one or more device-side TSN converters.

6. The method of claim 1, wherein the port resources comprise a plurality of port pairs; and
wherein a port pair includes a port number in the port number list of the device-side TSN converter and a port number in the port number list of the network TSN converter.

7. The method of claim 1, wherein the PDU session comprises a plurality of service quality flows,
wherein the plurality of service quality flows share the same port pair and respectively occupy different time slots in the same port pair,
wherein the plurality of service quality flows have the same period; and
wherein the port resources further comprise the same port pair shared, and different time slots for transmitting periodic time-sensitive communication service data flows in a quality of service flow respectively occupied by the shared same port pair.

8. The method of claim 1, further comprising:
sending, by the SMF device, the port configuration parameter to the network TSN converter.

9. The method of claim 8, wherein the sending, by the SMF device, the port configuration parameter to the network TSN converter comprises sending, by the SMF device, the port configuration parameter to a user plane function (UPF) device, such that the UPF device indicates the port configuration parameter to the network TSN converter.

10. The method according to claim 9, wherein based on an Internet protocol (IP) connection being between the UPF device and the network TSN converter, an indication manner of the UPF device to the network TSN converter comprises at least one of (1) indicating through an IP tunnel specified in an IP connection, (2) indicating through an identifier of a port IP wither provided by the network TSN converter in the port resources, or (3) indicating through an IP address corresponding to the IP connection; and
based on the UPF device and the network TSN converter being connected by a non-IP, the indication manner of the user plane function device to the network TSN converter comprises an indication of an identifier of a data link layer or an identifier of a physical layer.

11. The method of claim 1, further comprising:
sending, by the SMF device, the port configuration parameter to the device-side TSN converter.

12. The method of claim 11, wherein the sending, by the SMF device, the port configuration parameter to the device-side TSN converter comprises sending, by the SMF device, the port configuration parameter to a user terminal, such that the user terminal indicates the port configuration parameter to the device-side TSN converter.

13. The method of claim 12: based on an IP connection being between the user terminal and the device-side TSN converter, an indication manner of the user terminal to the device-side TSN converter comprises at least one of (1) an IP tunnel specified in the IP connection, (2) an indication of a port number provided by the device-side TSN converter in the port resources, or (3) an indication of an IP address corresponding to the IP connection; and
wherein, based on the user terminal and the device-side TSN converter being connected by a non-IP, the indication manner of the user terminal to the device-side TSN converter comprises an indication of an identifier or a physical layer of a data link layer.

14. A method for implementing data transmission of a time-sensitive network (TSN), the method comprising:
receiving, by an application function device, a port number list of a device-side TSN converter reported by a session management function (SMF) device and a port number list of a network TSN converter; and,
sending, by the application function device, a port configuration parameter to the SMF device, the port configuration parameter comprising port resources associated with a protocol data unit (PDU) session;
wherein the PDU comprises a plurality of periodic time sensitive communication service data flows;
wherein the plurality of periodic time-sensitive communication service data flows have the same quality of service requirement; and
wherein the periodic time-sensitive communication service data flows have the same period and the same period of service quality, the same period being a period of the plurality of periodic time-sensitive communication service data flows being the same, or the period of the plurality of periodic time-sensitive communication service data flows having a greatest common divisor.

15. The method of claim 14, wherein the reporting, by the application function device, the port number list comprises, after the PDU session is established, reporting, by the application function device the port number list of the network TSN converter.

16. The method if claim 14, wherein the port number list of the network TSN converter comprises a port number corresponding to a port of one or more network TSN converters.

17. The method of claim 14, wherein the reporting, by the application function device, the port number list of the device-side TSN converter comprises, during a session establishment process or a PDU session modification process of the PDU, reporting, by the SMF device, the port number list of the device-side TSN converter.

18. The method of claim 14, wherein the port number list of the device-side TSN converter comprises a port number corresponding to a port of one or more device-side TSN converters.

19. The method of claim 14, wherein the port resources comprise a plurality of port pairs; and
wherein a port pair includes a port number in the port number list of the device-side TSN converter and a port number in the port number list of the network TSN converter.

20. An apparatus for implementing data transmission of a time-sensitive network (TSN), the apparatus comprising:
at least one memory configured to store program code; and
at least one processor configured to access the program code and operate as instructed by the program code, the program code including:
port management parameter reporting code configured to cause the at least one processor to report, to an application function device, a port number list of a device-side TSN converter and a port number list of a network TSN converter; and
port configuration parameter receiving code configured to cause the at least one processor to receive a port configuration parameter issued by the application function device, wherein the port configuration parameter comprises a port resource associated with a protocol data unit (PDU) session;
wherein the PDU comprises a plurality of periodic time sensitive communication service data flows;
wherein the plurality of periodic time-sensitive communication service data flows have the same quality of service requirement; and
wherein the periodic time-sensitive communication service data flows have the same period and the same period of service quality, the same period being a period of the plurality of periodic time-sensitive communication service data flows being the same, or the period of the plurality of periodic time-sensitive communication service data flows having a greatest common divisor.

\* \* \* \* \*